(12) United States Patent
Hofmann et al.

(10) Patent No.: US 7,757,974 B2
(45) Date of Patent: Jul. 20, 2010

(54) METHOD AND APPARATUS FOR COMMINUTING AND CLEANING OF WASTE PLASTIC

(75) Inventors: Michael Hofmann, Buxtehude (DE); Alexander Feddern, Bad Oldesloe (DE); Jens-Martin Loffler, Buxtehude (DE)

(73) Assignee: CVP Clean Value Plastics GmbH, Buxtehude (DE)

( * ) Notice: Subject to any disclaimer, the term of this patent is extended or adjusted under 35 U.S.C. 154(b) by 245 days.

(21) Appl. No.: 11/909,232

(22) PCT Filed: Mar. 21, 2006

(86) PCT No.: PCT/EP2006/002602

§ 371 (c)(1),
(2), (4) Date: Sep. 20, 2007

(87) PCT Pub. No.: WO2006/100044

PCT Pub. Date: Sep. 28, 2006

(65) Prior Publication Data

US 2008/0191069 A1    Aug. 14, 2008

(30) Foreign Application Priority Data

Mar. 21, 2005    (DE)  ......................  10 2005 013 693

(51) Int. Cl.
*B02C 19/00*    (2006.01)

(52) U.S. Cl. .............................. 241/3; 241/20; 241/21; 241/24.14; 241/29

(58) Field of Classification Search ................... 241/21, 241/24.14, 29, 60, 20, 3, 79.1, 79
See application file for complete search history.

(56) References Cited

U.S. PATENT DOCUMENTS

| 5,154,361 | A | 10/1992 | Willoughby |
| 6,216,967 | B1 * | 4/2001 | Hoberg et al. .................. 241/21 |
| 6,565,027 | B2 | 5/2003 | Antensteiner et al. |
| 6,637,686 | B2 | 10/2003 | Antensteiner et al. |

FOREIGN PATENT DOCUMENTS

| AT | 408 768 B | 3/2002 |
| AT | 408 769 B | 3/2002 |
| DE | 41 21 024 A1 | 3/1992 |
| DE | 43 20 950 A1 | 5/1995 |
| DE | 198 01 286 C1 | 7/1999 |
| DE | 103 30 756 A1 | 2/2005 |
| WO | 95/04640 | 2/1995 |

* cited by examiner

*Primary Examiner*—Mark Rosenbaum
(74) *Attorney, Agent, or Firm*—Vidas, Arrett & Steinkraus

(57) ABSTRACT

Method for comminuting and cleaning waste plastic, in particular, mixed plastic (MKS) with the following steps: a compacted material, especially, an agglomerate is produced from film scraps or film remnants comminuted into flakes and/or thick-walled plastic parts chopped up into chips, the compacted material is introduced into a disc or drum refiner and is ground therein in the presence of water, wherein the portion of compacted material of the goods located in the refiner amounts to at least 10 percent by weight, a fine grain fraction is removed from the ground stock exiting from the refiner, the remaining ground stock is washed and either mechanically dewatered and dried, or pulverized again in a further refiner stage in the presence of water, and subsequently dewatered and dried.

47 Claims, 11 Drawing Sheets

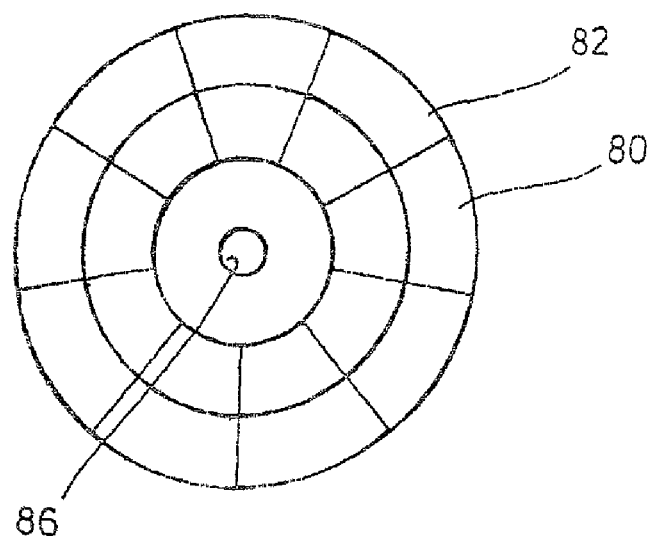
FIG.3
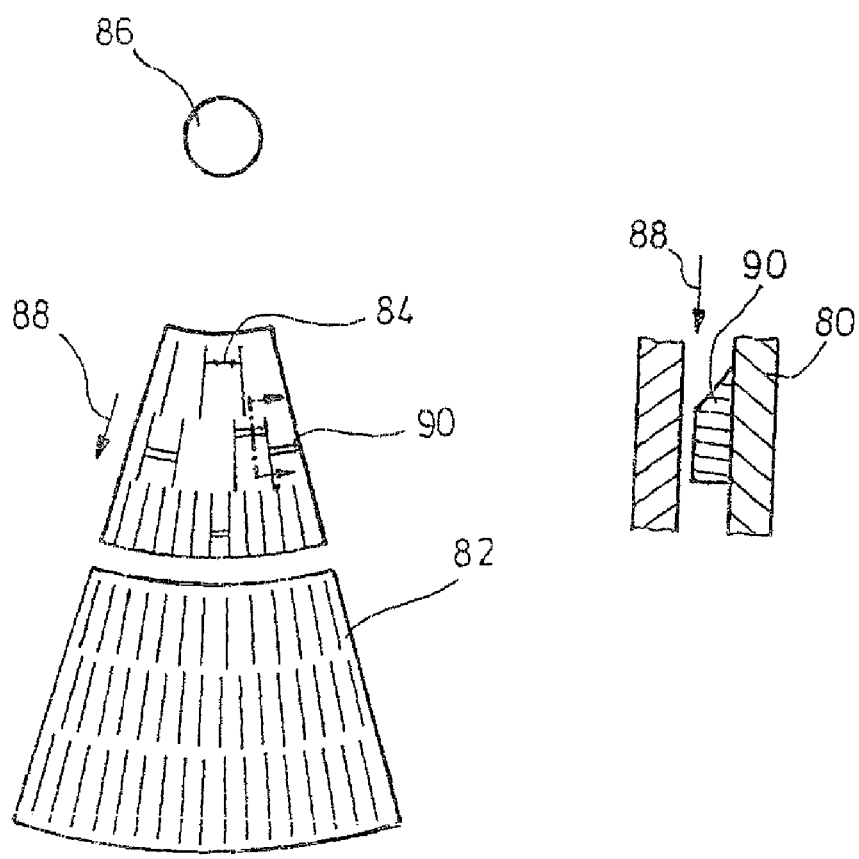

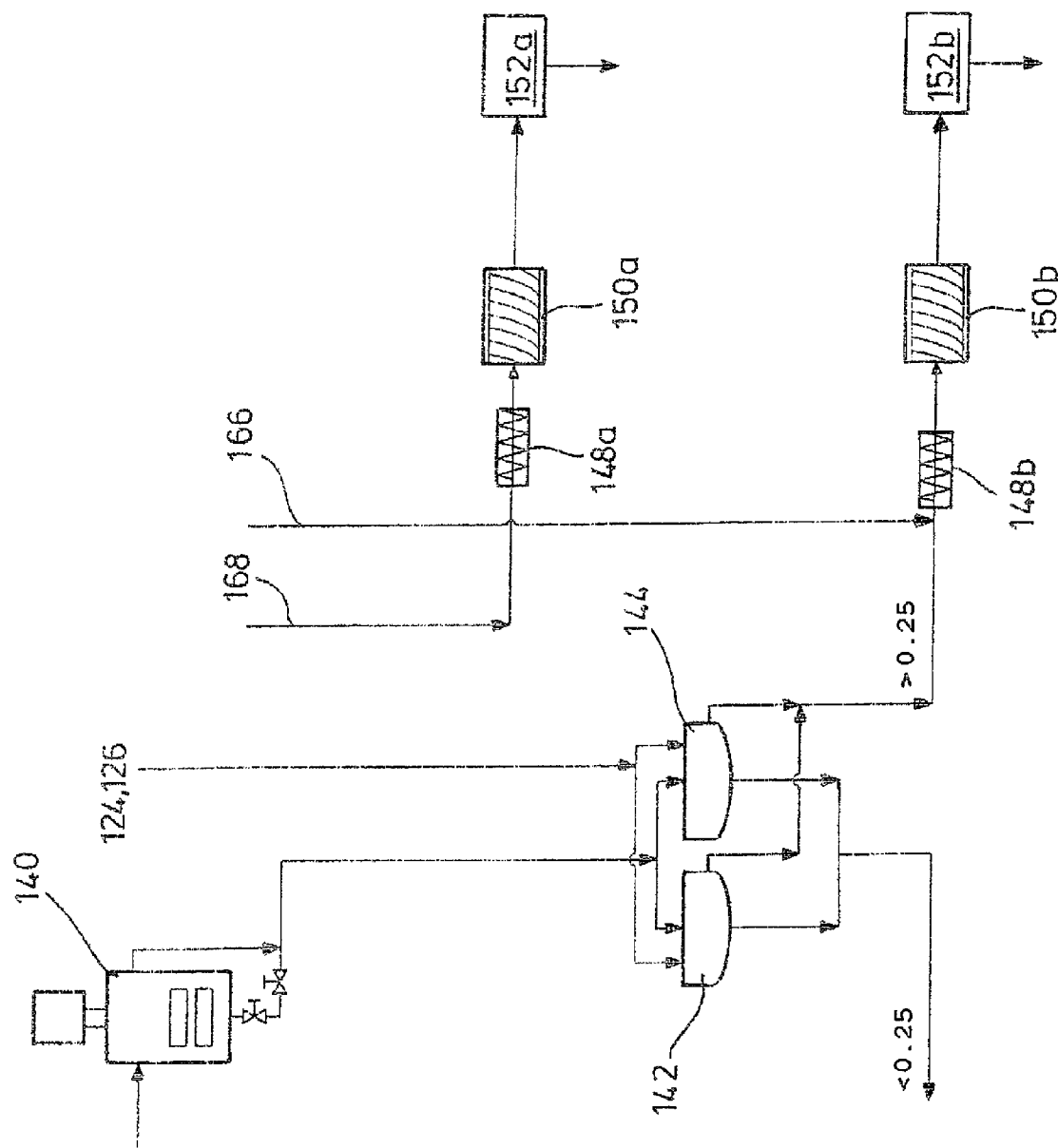

METHOD AND APPARATUS FOR COMMINUTING AND CLEANING OF WASTE PLASTIC

CROSS-REFERENCE TO RELATED APPLICATIONS

Not applicable.

STATEMENT REGARDING FEDERALLY SPONSORED RESEARCH

Not applicable,

BACKGROUND OF THE INVENTION

The invention relates to a method for comminuting and cleaning of waste plastic. The invention relates also to preparing the comminuted and cleaned plastics for various uses in the different grain size distribution curves. Finally, the invention also relates to the recovery of types of plastic from the comminuted mixed plastics.

With currently existing collection systems for waste plastics, e.g., packaging material from private households, yoghurt containers, protective wrappers, shopping bags, containers for cleaning products, toothpaste tubes, etc., mixed plastics are obtained at the end of the sorting chain. These include, along with the usual films and plastics composed of LDPE, HDPE, PS or PP, often film remnants composed of LDPE/HDPE coated with polyamides or PET films (compound films), polycarbonates, PET, polystyrene or other plastics. The quantitative material distribution of the various plastics, which are delivered to processing and sorting companies by collection companies, depend on, among other things, the collective behavior and quality awareness of the population. Despite advanced sorting, a complete separation of the various types of plastics is not attainable. Along with household collection systems, there are, however, also commercial collection systems exclusively for LDPE and HDPE plastics, with which predominantly plastic films are collected, which are produced using a sheeting calendar. Here too, increasingly mixed plastics, among others, compound films, accumulate. Furthermore, large quantities of packaging plastics are present in the ordinary household trash, most notably in urban areas. These mixed plastics collected there together with the household trash are currently separated on a trial basis, however, they are not yet systematically separated out and sent to recycling.

After an optimal cleaning and presorting, the mixed plastic (MKS) from collection systems are comminuted to flakes or scraps, after the so-called bottle fraction (e.g., laundry detergent bottles composed of polypropylene), but also large format film packaging have been separated out. The average "German" mixture from the "yellow bag" collection system is composed of 60-70% polyethylene, 5-10% polypropylene, 10-15% polystyrene and 5-10% of other plastics, The portion of PVC is less than 5%, with a decreasing trend.

Mixed plastic is naturally composed of more than one type of plastic, which can be separated to pure plastic only at a high expense, or not at all. According to this definition therefore, mixed plastics are also compound films, in which, e.g., an LDPE film is coated with a thin polyamide film or PET film. Currently, mixed plastics originate predominantly from the collection of packaging plastics. Mixed plastics are predominantly film remnants. However, mixed plastics can also contain chips from thick-walled containers or lids of injection molded parts. Thick-walled containers can also be film coated with protective films or similar, and are, therefore, mixed plastic.

Film scraps can not be ground up at all, or only unsatisfactorily. In many cases, the films are thinner than the grinding gap between the grinding discs, for instance, of a refiner, such that these pass through grinding process without being frayed. Only a compacting of the two-dimensional scraps into a three-dimensional agglomerate enables a satisfactory grinding process. This compacting optimally occurs in that the film remnants are formed into a wad by heating and at least partially surface-melted. This can occur together with chips from thick-walled plastic parts and/or together with other chip material or fiber material. A proven technology for this is the so-called pan agglomerator, which leads to the increase in a transport-optimal apparent bulk density in the form of a granular agglomerate. However, other methods for compacting film scraps into an agglomerate are also conceivable. Thus, for example, a targeted heating, which does not exceed the melting point of the carrier film, leads to a shrinking of the flakes, which in the process are compacted into an agglomerate, on their own, or moved in a drum, or passed through in a discharge chute by hot air.

It is essential for one aspect of the invention that the diameter of the created agglomerate does not exceed the distance of the grinder ribs of the grinder fittings of a refiner, because otherwise, this would immediately lead to a jamming of the intermediate space between the ribs. To prevent smaller material from slipping through between the grinder ribs, according to the invention, barriers can be built in between the ribs in the form of transverse webs. During the grinding process, the material is forcibly fed at these barriers into grinder gap between the grinding discs. These barriers are arranged with the disc refiners, as well as, also with cylinder or drum refiners at the appropriate location of the grinder fittings. In the simplest case, these barriers are welding spots; in the ideal case, the barriers are shaped out of the solid material during milling of the grinder fittings. The arrangement of the barriers depends on the type of the refiner, the distance of the grinder ribs and other parameters. The optimal arrangement is determined very simply on a trial basis by placement of welding spots, which can be removed again. The thusly attained grinder result is evaluated, and the final arrangement of the barriers is fixed on this basis.

In order to attain a sufficient transport bulk density, with the invention the flakes or scraps are compacted into a granular agglomerate. Depending on the purity and sorting, the granular stock is very uniform (with a high degree of purity control of the types of plastic), or it has a very non-uniform structure in both the appearance as well as in the consistency and the geometry of the agglomerate (high mixing of various types of plastic and different sources of origin, e g,., mixed plastics from household collection systems). During the processing, the mentioned agglomerating, the flakes or scraps are heated, e.g., in a pan agglomerator through friction by means of an agitator, such that they start to melt. By spraying the heated, melted plastic mass in intervals with cold water, a part of the organic components escapes via the water vapor. At the same time that the melted film pieces cool off, they are broken by the rotor blades of the agglomerator, and agglomerated into pourable, granular-like bodies. This agglomerate has a relatively high bulk density of approximately 250 to 350 kg/m$^3$ and can be transported very easily. This method is described in DE 198 01 286 C1, the entire contents of which is incorporated herein by reference. However, there are also so-called disc agglomerators, which attain similar effects with the necessary compaction of the material. Other methods of compaction such as melting of flakes in a hot air stream or in a heated mixing drum, or also the compaction into pellets using sieve matrices are also possible.

In U.S. Pat. No. 5,154,361, the entire contents of which is incorporated herein by reference, a method is described in which film flakes, in particular, large format film remnants together with pulp are to be comminuted in a refiner, wherein a suspension is supplied beforehand, in which the plastic film, e.g., from shipping envelopes can be pre-comminuted in a Valley beater. This suspension is treated subsequently with additives and antifoam reagents, which are to prevent foam formation of solute adhesives, and shredded in a disc refiner in the presence of pulp. This method concerns especially the so-called rejects that accumulate in large quantities in the treatment of recovered paper, that is, pulp of recovered paper contaminated by plastic. The disclosed method has the purpose to pre-comminute the film flakes through pretreatment, such that together, with the pulp they form a fiber pulp. This is then ground up, such that pulp and plastic fibers are contained in this pulp in nearly equal size. Plastic films as rejects from the recovered paper are always tainted with a quantity, more or less, of cellulose fibers. As a result, the recycling industry would rather not accept these materials, because due to the moisture of the pulp fibers, e.g., they do not permit satisfactory agglomeration. Despite the high cleanness of the film, the pulp adhesion makes melting into a regrind economically impractical. The goal of the disclosed method is to improve the core of gypsum boards with this fiber material composed of plastic with additions of pulp. The method is described for very low material consistency, as is known from the grinding of cellulose pulp, that is, namely a maximum of 4.25%. The material is not first compacted into agglomerate. Because pulp is systematically provided in the process, the consistency for the cellulose pulp must not be exceeded.

In DE 103 30 756, the entire contents of which is incorporated herein by reference, a method for the production of a fiber material is disclosed, in which method a second group is mixed into a first group of fibers, where the second group is composed of plastic particles or fibers, which are obtained by comminuting and/or shredding of agglomerates of pure or mixed plastics in a disc refiner. Water is supplied to the disc refiner during the comminuting. The grain size of the plastic particles and/or plastic fibers corresponds approximately to the grain size of the particles of fibers of the first group.

The disclosed method serves, above all, for the production of molded parts composed of wood materials, wherein a portion of the wood fibers are substituted by plastic particles and/or plastic fibers. Here, but with other uses, a specific size of particles or fibers is of great importance. With the disc refiners, despite a narrow gap width it can occur, that a certain undesired portion of relatively long and large fibers or large grain chips are created from MKS. The cause of this lies in the fact that with a disc refiner, the ground stock is subjected to a strong centrifugal force due to high speed of the rotors, and thereby relatively large dimensioned particles can slide through between the grinding discs in the rib troughs of the grinder fittings to the outside. Barriers between the rib webs would be associated with the risk of blockages, because, e.g., wood chips are also ground up as the second material component. Therefore, it is necessary to add to this type of comminuting process a sorting process or separation process, using which the relatively large plastic fibers are separated out. Furthermore, the method described there, uses a refiner operated under an atmospheric pressure or under steam pressure, in which the ground stock is supplied via a screw conveyor (plug screw) to the refiner.

The objective of the invention is to specify a method for comminuting and cleaning waste plastic, especially mixed plastic (MKS), which open up a plurality of recycling possibilities of the processed waste plastics.

BRIEF SUMMARY OF THE INVENTION

Essential to the invention is that with the method according to the invention a fine grain fraction is removed after the comminuting of the waste plastics in agglomerated or compacted form in a disc or drum refiner. This fine grain fraction, according to one embodiment of the invention, has an average grain size of maximally 0.3 mm, preferably of a maximum of 0.25 mm. A cleaning of the plastic takes place in the refiner by washing and abrading, wherein the contamination particles, which have a small grain size, some glass splinter, ground pulp or superfine aluminum powder can be discharged with the process water. Contaminations still remaining in the ground stock can then be largely removed by washing of the remaining ground stock. Furthermore, the described method step has the advantage that specific interfering types of plastic, especially very hard plastics such as, e.g., hard PVC tend to be ground very finely. This ground stock is, as a rule, poorly suitable for recycling. Therefore, from the outset, the remaining ground stock contains already a small percentage of interfering materials.

With an embodiment of the invention, the removal of the fine particle fraction occurs in a sieve or a sorter.

The method according to the invention will be operated in practice with material consistencies of at least 10% to over 30%. In preparation for the agglomeration, the MKS is compacted and forms no pulp. The agglomerate can be uniformly distributed into a surrounding aqueous medium before it is transferred into the refiner. The water is used as a transport, cleaning, and cooling medium. Additives as an antifoam means are not necessary.

Only through the compacting into an agglomerate, a ground stock is created which, at high consistencies, can be solubilized in a refiner also without processing into a pulp, and without addition of additives and agents in preparation, for example, together with pulp. The quantity of particulate matter for the grinding process enables a relatively large material yield.

With the invention it is essential to perform a compacting of the mixed plastics into an agglomerate. If this step of the process is not performed, individual film flakes are passed through the grinder gap of the refiner without comminuting, without shredding. Here, the apparent density of the agglomerate and also the addition of other materials during agglomeration are not important, because it is only essential that through the compacting carried out during agglomeration, a ground stock is created, which can be comminuted as a whole piece in the grinder gap of the refiner. With the use of the subsequently-described grinding in so-called low consistency refiners, compacted agglomerate composed of mixed plastics in grain sizes of 1-20 mm and in dry, ground, apparent densities of 150-400 kg/m$^3$ can be processed. In any case, it is important for the success of the grinding that the film flakes are bound to each other by melting, entanglement contraction, at points or over their complete surface, and thereby yield a compacted ground stock, the said agglomerate.

With the method according to the invention, the agglomerate can be used completely in an aqueous medium in low-consistency refiner. This can be a disc refiner, or also, a drum or cylinder refiner. The low consistency refiners differ significantly from the disc refiners described in DE 103 30 756.

These refiners are used for grinding up already pre-ground fibrous materials in an aqueous suspension of low consistency.

The use of these low-consistency refiners is known in the paper industry, where pulp as baled goods is dissolved in an aqueous suspension, and ground until the desired fiber quality is attained. These refiners require a very low consistency of the suspension in order to yield technically flawless results during grinding, and in their application area can grind up merely pulp consistencies (pulp proportions) of approximately 4-6%. The development as a drum refiner is fundamentally known, e.g., from AT 408768 B or AT 408769 B. A drum refiner has a long, cylindrical or ring conical grinder gap, whose width can be adjusted by various means. Such drum refiners are also used in the paper industry for the purpose of comminuting pulp fibers into a slurry-like pulp. Low consistency drum refiners, compared to low consistency disc refiners, deliver an improved grinding of the pulp fibers, above all, for fine paper, such as, cigarette paper, inkjet paper, or photocopier paper.

With the method according to the invention, a low-consistency refiner is used as a disc refiner or drum refiner for comminuting of agglomerated mixed plastics. Surprisingly, it has been shown that the agglomerate composed of mixed plastic that is coarse compared to the very fine pulp fibers, can be comminuted very well to the desired grain sizes and fiber sizes. The drum refiner, compared to the disc refiner, has the advantage that due to the absence of the centrifugal forces and non-uniform rotational speeds that occur with disc refiners a relatively uniform grinding of agglomerate is attained. Therefore, the grinding process can possibly be better controlled than with a disc refiner and delivers a ground stock with a lower spread of the grain-size distribution curve of the ground stock (lower differences in the grain sizes or uniform distribution of the grain sizes). A refiner, according to an embodiment of the invention, can be formed from several stages, wherein each stage has a progressively smaller grinder gap than the preceding one.

According to an embodiment of the invention, the agglomerated plastic together with the water is introduced in high consistency under pressure into the refiner provided for low consistencies. Preferably, the grinding process occurs in circular flow, whereby the ground stock is extracted, and the process water is fed back into circulation to the process. Here, the ground stock can be extracted completely for further separate processing steps, or partially, or completely sent together with the process water for repeated grinding through the same refiner, or to a further refiner. In this way, a controlled comminuting can be obtained with use of a minimal amount of process water. The process water can be subjected to a purification before it is fed back into the process, or is completely removed from the circular flow. The circular process ensures that only a very small amount of process water is necessary for the method according to the invention, especially if the percentage of agglomerate is high.

The use of an already-described disc refiner for comminuting of agglomerate in a controlled manner can occur according to the invention also in such a way that the agglomerated mixed plastic together with the water is introduced into a refiner, where the proportion of water is greater than that of the mixed plastic. The ground stock with the process water can be introduced back in circulation into the disc refiner at least one time. Such a method is already known in the paper, industry for the grinding of pulp, however, it has not been used up to now for the comminuting of plastics or of agglomerated plastics. In addition, the method according to the invention has the advantage that the proportion of mixed plastic relative to the proportion of water can lie significantly higher than that with the method in the paper industry, for example, at least 10% and higher.

According to an embodiment of the invention, it is also possible to feed back the ground stock with the process water once or multiple times in circulation before the removal of the fine particle fraction, which leads to an improvement of the comminuting and the cleaning effect. The service water, according to one embodiment of the invention, can be led back from the individual process stages after the grinding process into a process stage arranged before it in the feed direction.

The method according to the invention can also include a gravitational separation process, by introducing the remaining ground stock (without the fine grain fraction) into a vessel for gravitational separation. Thereby, various plastic groups and separated organic and inorganic materials can be separated. Naturally all ground plastics with a bulk density of <1.0 kg/m$^3$ float, whereas the remainder with an apparent density of >1.0 kg/m$^3$ sink. This results in that polyethylene and polypropylene (unless it is mixed with filler material) float, whereas polystyrene, PET, polyamide, and PVC sink. Similarly, inorganic substances composed of print, coloring, or filler material with an apparent density of >1.0 sink, The latter described method has the further advantage that water soluble or water insoluble interfering materials (organic material, filler material, glass splinters, etc,) are washed out by the process water and absorbed. This washing leads to the fact that the ground stock obtains a good pourability, whereby it can be employed in spreaders, as used in PVC processing and for the production of PVC floors, for example, with the production of base boards for laminated flooring. The compacting of the mixed plastics into agglomerate can also occur using the addition of chip stock or fiber stock, e.g., composed of wood chips or wood fibers during the agglomeration of the mixed plastics.

A reduction of the spread of the frequency distribution of the sieve proportion with the grinding can be attained in the following ways:

Two refiners, or also several refiners are connected in series after each other, wherein the first refiner pre-grinds the agglomerate and the further refiners, in each case, post-grind the larger particles of the preceding grinding. The result is a very uniform grinding. This method delivers a very high capacity and is less costly than to re-grind the complete stock, or sieved partial fractions. With mixed plastics, a relatively high degree of reproducible results becomes apparent, even when the agglomerate itself is non-homogenous. The second reason is based on the distance of the grinding ribs in the grinding plates or drums of the refiner being constructed such that the spacing between the ribs is respectively greater than the greatest diameters of the grains of the agglomerate to be ground. If the grinding discs are selected with the narrow rib spacing customary with pulp grinding, after a short time, individual agglomerate particles wedge themselves between the ribs, which leads to an obstruction of uniform grinding. With the pre-comminuted ground stock from the first grinding, the spacing between the ribs of the grinding discs of the next refiner in the series can become narrower, which leads to an improvement in the mass flow rate. Here too, it must be observed that the spacing between the ribs is adapted to the ground stock, i.e., that no grains have a diameter that is greater than the distance between the ribs such that no obstruction to the grinding results from a blockage of the space between the ribs. With the known grinding of pulp in low-consistency refiners, the spacing between the ribs of the grinding discs influences the power consumption of the refiners and the throughput to be adjusted to the machine: the narrower the spacing between the ribs, the higher the throughput.

Naturally, the radial alignment of the milling ribs affects the throughput and the power consumption of the refiner. Along with the strong radial alignment of the ribs with a disc refiner, inclined and arc-shaped arrangements of the ribs are possible. This is similar with a drum refiner, in which the perpendicular alignment of the grinder ribs to the tangent on the grinder cylinder corresponds to the radial alignment with the disc refiner. With a deflection in the feed direction, similar to the flow profile of an airplane airfoil, the grinder ribs create a pump effect through pressure build-up in the water that furthers the material throughput. In so-called backhold operations, the pump effect is reversed by reversing the direction of rotation of the refiner. Thus, a pressure gradient to the refiner axis of rotation develops that ensures a longer dwell time of the ground stock in the grinder zone. With mixed plastics, this measure shows a noticeable effect on achieving uniformity of the grinder results, however, it is connected with a substantial increase in the power consumption and the use of electrical energy. The capacity of the machine decreases such that in terms of maintaining an appropriate capacity, in any case with mixed plastics, the method described above is to be preferred. However, in cases where a particularly fine and uniform grinder result is desired, the backhold operation, also with one of the two refiners connected in series, is a method for attaining particularly uniform grinder results. However, this method requires that the ribs of the grinding discs deviate from the strict radial alignment, and are arranged inclined or arc-shaped.

Thus, the series connection of two or more refiners is a very good method for comminuting mixed plastics, if with a high throughput a grain size distribution curve with a narrow spread is to be attained, or when a material fractioning according to grain size or fiber size is to be performed.

If the results of the ground mixed plastics are not yet sufficient, the ground stock can be sieved or filtered according to fractions. The customary way used to date, is a sieving of the dried ground stock. Surprisingly, the use of inline sorter mechanisms shows noteworthy results.

If specific larger sieved parts are to be filtered out from a grinding, this can take place, according to an embodiment of the invention, very efficiently already in the wet process directly after the first grinding and/or after the second grinding, by connecting an inline sieving, e.g., a so-called sorter, in series directly behind the refiner. The sorter is a cylindrical vessel with an inlet valve and an outlet valve. The cylinder is perforated with holes or slits, which are adapted to the size of the products (reject or accept) to be sieved. An interior lying rotor, using tangentially arranged blades, drives the sorted stock past the intrados of the perforated cylinder. Ground stock, which is finer than the diameters of the holes, passes through and is separated. The stock that is held back leaves the cylinder on a separate way. With the use of this technique with mixed plastics, a noteworthy result is obtained: It successfully filters, e.g., with a hole diameter of 1 mm, the finest mixed plastic fibers from the fine fraction. This fine portion can serve as polymer aggregate, e g, for improving flexible tile adhesives or similar uses.

The sieved stock to be designated as acceptable in this case, has the consistency of a slurry, is distinguished by a high homogeneity and can be excellently treated separately as a fraction. It should be noted that despite the hole diameter of 1 mm, only significantly finer parts of mixed plastic pass the sieve. With larger diameter holes, the dimension of the passed stock is correspondingly shifted, however, a similar effect is shown. Conversely, the sieving with the sorter leads to a reduction of the spread of the grain size distribution curve with the remaining stock.

With the grinding of mixed plastics in low consistency refiners, along with the removal of the finest parts, there is the advantage of efficient inline sieving of various mixed plastic fractions. The material separation of the ground stock can be carried out economically with the method described above, and above all, without disruption in the grinding process itself, because the ground stock does not need to be separated out from its aqueous medium. The extraction of the fine or finest parts prevents its emission via the exhaust and therefore, the installation of expensive dust filters, if drying occurs conventionally with throughflow dryers, stream dryers, and not with superheated steam.

During the compacting of flakes of waste plastics, contaminants are included in the agglomerate: organic residues, calcium and magnesium (from fillers such as talcum) or chloride (common salt) adhere to the flakes and in the agglomeration process are partially enclosed between the individual film layers of the compacted material. For this reason, with the use of agglomerates of mixed plastics from collection systems, in the past, the annoyance caused by unpleasant odor could not be prevented. The chloride portion is viewed as especially critical with mixed plastics. Chlorides lead to increased corrosion in the system of standard metals (non-stainless steel) and can, during combusting or with use as a carbon carrier in the reduction process with the production of steel, lead to the formation of undesired, or, through the formation of dioxides, to critical emissions.

The grinding in a low-consistency refiner arrangement leads, through the decomposition of agglomerate automatically to an efficient cleaning. Thus, e.g., the portion of chlorides of over 0.9% in the starting material (mixed plastic agglomerate) was reduced to under 0.4%, that is, by more than half. Therefore, it is possible to better use the mixed plastic material, ground according to the described method, as fuel or raw material because the expected emissions are drastically reduced.

Organic contaminants, such as those occurring easily with food packaging, e.g., by yoghurt containers that have not been cleaned completely, or adhesions to the plastic wastes, which are sorted out of the household trash, do not dissolve or dissolve only partially in the process water. Rather, suspensions form in which the organic parts float as fine or fiber particles of matter. These can be filtered off by the use of appropriate filters. Dissolved material, e.g., emulsified food additives can be precipitated by the addition of appropriate precipitants, and filtered off.

Because the grinding of mixed plastics according to the invention can take place with consistencies of above 30%, the water consumption, and therefore, the water contamination are comparatively low. For instance, a chemical analysis of the process water with a 30% consistency of the mixed plastics yielded a chloride portion dissolved in water of 0.6% in the waste water, and a pH value of 5.5. The ash content, which is an indicator for non inorganic components, yielded values under 3.5% for the ground agglomerate. Therefore, these values lie significantly below the values, which with non-ground agglomerate can be above 7%.

The inorganic components are found in the process water in the form of calcium, magnesium, sulfates, and silicon compounds. The process water pH value of 5.5 is an indicator for the high cleaning effect of the described method according to the invention. The shredded mixed plastic, even after being immersed in cleaned water for several days, no longer effects any changes to the pH value whatsoever. Mixed plastic agglomerate on the contrary leads to an increasing lowering of the pH value with immersion in water or a water-saturated medium. Depending on how contaminants are included in the agglomerate, it can sometimes take a very long time—up to a year or more—until there are no more changes to the pH value.

With the method according to the invention, the bulk material composed of waste plastic agglomerate to be used can be very strongly contaminated. Even large glass splinters pass the grinding process and are ground into a fine dust without damaging the grinding discs. Splinters can be filtered off or are deposited in the cleaning vat due to the high density. Even high contamination composed of organic residues can be reliably absorbed in the process water and can be sieved off as floating particles using the sorter and sieve. Aluminum residue passes the grinding procedure, similarly, without disruption to the process. Only harder metals, especially steel pieces and iron parts must be reliably extracted before the formation of the agglomerate, because these can lead to damage of the grinding discs.

The cleaning steps and sorting steps carried out up to now with many of the sorting processes of waste management industry can be eliminated with the use of the method according to the invention. Because the sorting costs represent a high cost portion with the preparation of mixed plastics for recycling, the described method generates a high economic advantage for the recycling of mixed plastics. It is merely necessary to comminute film into chips or flakes, and thick-walled parts composed of bottle remnants or caps into chips, and to compact these into an agglomerate. Even a pre-cleaning through the shocking with water in the pan agglomerator is dispensable such that other technologies can also be used for compacting into agglomerate. The cleaning effect attained through shocking is limited, and does not lead to a complete cleaning. However, a high cleaning expenditure of steam is necessary with this process. Because the cleaning can be performed completely in described process according to the invention, even with strong contaminants, high savings potentials result from the installation of simpler compacting processes even with strongly contaminated agglomerate.

A costly purification process is eliminated by a filtration with inline sieving, e.g., the sorter. The sorter technology, even at the end of the process chain, still enables the filtering removal of floating particles, which predominantly embody the impurities The test have shown that after performing the grinding process it is advantageous to extract the process water with the fine particle fraction from the remaining ground stock, e.g., into a curved sieve, and to collect the ground stock in a fresh water vat, and to stir with an agitators before the material discharge. This results in a thinning of the impure process water still adhering to the fiber material. Here a sample calculation:

300 kg of mixed plastic agglomerate is ground up in 700 kg of process water. After passing through the curved sieve, 100 kg of impure process water remained as the surface water in the ground stock. The entire quantity of 400 kg is fed again into 600 kg of clean water, of which 100 kg are process water. Thus, the thinning amounts to 100 kg/600 kg, that is, approximately 16%. After the extraction of the ground stock from the concluding cleaning, the ground stock leaves the process after passing through a squeeze dry screw with a remaining moisture of approximately 30%. That is 90 kg of water from the 600 kg. The remaining 510 kg with low impurities are led again into the material insertion vat as replenishment water. The water circulation is cleaned by filtration with the sorter permanently of floating particles. If too strong a reduction of the pH value below 5.5 occurs, the pH value is corrected, e.g., by introducing a suitable alkali treatment. With this process there is practically only a water consumption from the replenishment of the surface water leaving with the finished ground stock from the cleaning, and leakage losses customary with the process. Because after the pre-drying and filtration, the process water is led back into the reservoir for the agglomerate and water.

The ground stock can be pre-dried after the cleaning, preferably mechanically, e.g., by means of a screw. Mechanical water draining methods such as the draining with the screw yield a ground stock with approximately 30% moisture. The ground stock is still pourable, even in the wet state. The screw does not jam, and has a throughput at least 50% greater than the mechanical pre-drying of pulp. The ground stock, at a room temperature of approximately 20° C. and a bulk height of approximately 1 cm, dries within a time period of approximately 4 hours without further measures. The power consumption for the drying of the ground stock lies e.g., at ¼ of the power consumption of wood fibers. Therefore, expensive drying method such as the steam drying are eliminated or reduced to a minimal power consumption.

The mechanical compression of the ground mixed plastics, while retaining the pourability as much as possible, leads to a high degree of draining.

For the process, the apparent density of the agglomerate is of secondary significance. The production of agglomerate of high apparent density up to a bulk density of 350 kg reduces the transport costs, however it leads at the same time to a higher energy costs, and to a reduction of the capacity with the agglomeration. The production of a suitable apparent density must be economically balanced. Thus, an operator of a system for comminuting will be working with low apparent density during agglomeration, when the agglomeration formation is performed in the process chain itself. With additional purchase of agglomerate, the logistics costs play a larger role, above all, with larger transport distances. For the process itself, the raw density within the boundaries of between 150 and 450 kg/m$^3$ plays no essential role, because the process can be operated with nearly uniform consistency. However, higher apparent densities lead to a greater, energy requirement during the comminuting. If the higher apparent density of the agglomerate comes from a higher percentage of chips from thick walled plastic remnants, and less from wadded film flakes, a more granular ground stock results. Conversely, with use of film remnants a more fibrous ground stock results. It should be noted that with the methods for the grinding in atmospheric or pressure refiners described so far, agglomerate from pure film can not be ground because after a short time melting onto the refiner discs occurs. The described method also permits the grinding of agglomerate of pure film remnants. Even the addition of so-called stretch film, which up to now was regarded as not grindable in proportions of greater than 30%, can be ground with the method according to the invention when there are added into the agglomerate in quantities of over 30%.

According to a further embodiment of the method according to the invention, a portion of the ground stock with a predetermined grain size range can be mixed as the second material component with at least one first material component, and the grain size range is selected such that the physical properties of the first material component are changed and/or portions of the first material components are substituted. The first material component can have wood fibers for a fiber board (MDF, HDF) of medium or high density or a particle board, whereas the second component has a fiber form as a binder and/or wood substitute, and lies in the grain size range of <0.63 mm.

Through the grinding process according to the invention, the agglomerate composed of mixed plastics is comminuted, wherein various grain sizes arise. The grain sizes can be separated using a common sieving according to a predetermined grain size distribution curve. The grain size distribution curve has different characteristics depending on the grinding principle used. For instance, one passage of the agglomerate through a disc refiner with a grinder gap of 0.1 mm yields the following particle size distribution:

| | |
|---|---|
| Grain size > 5.00 mm | Portion: 0.68 M % |
| Grain size > 3.15 mm | Portion: 6.56 M % |
| Grain size > 1.25 mm | Portion: 55.11 M % |
| Grain size > 0.63 mm | Portion: 26.50 M % |
| Grain size > 0.40 mm | Portion 5.53 M % |
| Grain size > 0.16 mm | Portion: 3.70 M % |
| Grain size <0.16 mm | Portion: 1.91 M %, | where M % is percent mass.

After the grinding, it can be determined that the individual sieved grain size portions are no longer composed of the same portion of the plastic types as the starting material of agglomerated mixed plastic. Whereas the agglomerate as a somewhat homogeneous mass is predominantly composed of PET, PS, LDPE, HDPE, and PP, the individual fractions are separated by the grinding, as far as possible, into combined partial fractions. Thus, in the above described example in the fine grain portion <0.40 mm, there is a large portion of PP and PET and a small portion of LDPE. HDPE can also be found only in smaller portions. This results from the hardness and brittleness of the different types of plastic. Thick-walled PP and PET, for instance, are harder than LDPE, and as a result can be better ground finely, whereas LDPE yields fibrous ground stock which can be found here, for example, rather in the fraction of 1.25 mm to 3.15 mm. HDPE and PP file are harder and of various toughness. Therefore, during grinding there results partially, a round-like grain and partially fibers, which can be found more strongly in the fraction of 0.63 to 1.25.

In the example given above, there is also the fraction >5.00 mm of flakes composed of HDPE and PP. Here, the corresponding film material, e.g., is only insignificantly comminuted by the discs of a refiner, even if, as specified in the example above, the spacing between the discs amounts to only 0.1 mm. Depending on the sieving, it can also contain LDPE fibers, which due to their fibrous structure have loosely accumulated into conglomerates, and thus are greater than 5.0 mm.

The fractions resulting through the grinding of agglomerate composed of mixed plastics, are not pure by type, however, there results a high portion of a specific type of plastic for a specific grain size. Therefore, through grinding and sieving of the plastic agglomerates, a separation according to the type of plastic can also be carried out. Thus, for example, a fine grain portion <0.40 mm contains a large portion of formerly thick-walled PP and PET and a very low portion of LDPE. Formerly thick-walled HDPE can also be found only in smaller portions. This results from the hardness and brittleness of the different types of plastic. LDPE yields fibrous ground stock predominantly in the range of 1.25 to 3.15 mm. HDPE and PP are harder and can be found substantially in the size range of 0.63 to 1.25 mm.

According to an embodiment of the invention, the ground stock in the grain size range of <0.63 mm is mixed with wood fibers or wood chips from fiber board and particle board, wherein the fibrous plastic particles serves as binder and/or as a wood substitute. Through the use of an agglomerate of sorted films composed of LDPE and HDPE, there results a higher fibrous portion over 0.63 mm than a pure mixed plastic with portions composed of LDPE compound film with PET and/or PA.

With a particle board, a substitution of wood fibers is carried out preferably with plastic fibers in the size range of 1.25 to 3.15 mm.

For the production of highly compressed MDF boards, so-called HDF boards, for laminate flooring, preferably a high fiber portion of <0.63 mm is used, in order to attain a homogeneous board structure with high transverse tensile strength and high moisture resistance. This can be attained in several ways, by 1. increasing the portion of fine grinding plastics, such as, e.g., PET and/or thick-walled PP and/or LDPE compound films with PA and/or PET in the presorting of the mixed plastic;
2. increasing the number of grinding passes in order to obtain a higher portion of LDPE;
3. creating, through longer dwell time in the agglomerator, an agglomerate with apparent density up to 350 kg/m$^3$ that through better adhesion of the film flakes is ground to finer fibers;
4. including in the agglomerate comminuted LDPE chips or HDPE chips of injected mold parts, such as, e.g., bottle caps, during agglomeration, and
5. carrying out targeted fractioning by sieving after drying of the ground stock.

It is known that fibers (steel, glass, or plastic) can be mixed into concrete and floor pavement, so that defined mechanical properties are achieved for special requirements. This concrete is called fiber reinforced concrete or analogously fiber reinforced floor pavement. Concrete and floor pavement have a low bending tensile strength and tensile strength, breaking ductile yield, and impact toughness, as well as a high cracking tendency. These properties can be improved by mixing in fibers. The fibers can absorb tensile stresses, which arise e.g., by the draining of the heat of hydration, or shrinking processes, or outside load effects. Through the fibers, it is achieved that after exceeding the tensile strength of the concrete or floor pavement, instead of a few large cracks, rather many fine cracks form, which are bridged by the fibers.

A fiber fraction, preferably in the size range of 1.25 to 3.15 mm, can be used, wherein the fibers preferably contain a high portion of LDPE, HDPE, or PP. At the same time, by the addition of a somewhat more granular HDPE portion, the ductility of the concrete or floor pavement can be increased.

Concrete is finding many uses in building construction. It is known that with concrete also fire protection requirements can be satisfied, wherein there are limits for the concrete. Due to the tight pore structure, chemically unbound water in the concrete can not escape fast enough and spalling can occur. Measures for improving the behavior in fire protection are, among others, the dimensioning of the reinforcement of the concrete for the case of fire, or the addition of steel fibers, in order to prevent spalling. Another possibility is to add plastic fibers to the concrete, e.g., textile fibers, which in the case of fire disintegrate or melt. This leaves channels behind through which the water can escape, without leading to spalling.

According to the invention, a fraction of agglomerate composed of mixed plastic can be used for this that is fiber-shaped and lies in the size range of 1.25 to 3.15 mm. As plastics, predominantly HDPE and PP come into consideration. The portion of LDPE fibers would melt somewhat earlier than the portion of HDPE fibers, which with the temperatures prevailing during a fire is not significant.

Insulating materials composed of glass and stone find a broad applicability for heat insulation, fire protection, and for sound insulation. They are used as panels, mats, felting, in bulk or layers on roofs, ceilings, walls, and pipes or air lines. Mineral wool is mostly yellow, stone wool is mostly gray/green.

As raw material for the production, glass raw material, recovered glass, volcanic rock, or limestone are used, wherein the trade name indicates the respective basic raw material. The specification of the individual components exhibit such a broad overlap regarding the possible quantitative composition, that from the chemical composition alone, frequently no certain classification according to the specific types of fibers can occur. Mineral wools are provided with binders and melting means. Phenolic resin is used as binder. These additives guarantee a permanent hydrophobicity, act as a lubricant, improve the adhesion, bind the fibers in the compound, and prevent the premature breaking of the fibers. The fiber mat is passed through a throughflow dryer. The mat is guided via sieve conveyors by which the hot air is blown through the mats (with mineral wool approximately 150° C. to 200° C.).

According to the invention, with the production of such an insulation materials LDPE and HDPE fibers can be used, which take on the above described binder function in the insulation. For this, the plastic fibers have a size of approximately 1.25 to 5.0 mm.

Wood fiber insulation is used for heat insulation, fire protection and for sound insulation. They are used as panels or rolls. A further use is an impact sound insulation with low thickness. It is known, that aerodynamic mat forming methods can be used for the production of insulation materials with wood fibers. With aerodynamic mat forming methods the wood fibers are combed using a tambour and aligned three-dimensionally. The mat passes through a throughflow dryer under pressure, wherein plastic fiber are used as binders. For this, so-called BiKo fibers (two component fibers) are frequently used.

According to the invention, a sieve fraction can be selected for this that contains LDPE fibers, HDPE fibers, and HDPE in granular form. Preferably, the size of the fibers amounts to between 1.25 and 5.0 mm. The plastic fibers serve as a binder, whereas the granular components function as filler.

It is known that polymers, such as e.g., the elastomer styrene-butadiene-styrene or the plastomer a tactic polypropylene can be added to the binder and sealing material bitumen. Special mechanical properties, such as e.g., improved heat resistance, good elastic behavior at low temperatures or a longer service life can be achieved with the resulting elastomer bitumen. The plastomer bitumens produced by plastomer addition are distinguished by a sufficient cold flexibility, a distinctive weathering resistance, or a plastic behavior.

ccording to a further embodiment of the invention, plastic particles of ground agglomerate in the size range of 0.4 to 5.0 mm can be introduced as aggregate with asphalt. For this, preferably fibers of the plastic types PP, LDPE, and/or HDPE are used.

ith the method according to the invention, a fraction can be isolated in which PP particles are contained at a high proportion. Furthermore, it is possible by addition of fractions with a high portion of PE particles isolated from agglomerated mixed plastics to create an elastomer bitumen. If necessary, it is possible to combine the raw materials together to use the properties of both mixed plastics.

t is known that plastic can be used as a reducing agent with the production of steel. To isolate pig iron, initially, oxygen must be removed from the starting material iron ore. This method is referred to as reduction. For this, normally heavy oil or pulverized coal are used as a reducing means: synthesis gas is isolated from the natural raw materials, which ensure the necessary chemical reaction in the blast furnace.

s is known, the reduction can also be carried out with plastics. The agglomerate is pumped by pressurized air into silos through tubing as thick as an arm. The agglomerate arrives into the hot blasting furnace melt, at over 2,000 degrees Celsius. Before the plastic can burn, the extremely high temperatures ensure that it is abruptly converted into synthesis gas, and can fulfill its function as a reducing means. The synthesis gas removes the oxygen from the iron ore during the pass through the oven. The recycling process in the steel works consist in that usable gas is created from plastic. Heavy oil and pulverized coal, which would otherwise serve as the reducing means, are replaced at a one to one ratio.

According to the invention a granular or powdery ground agglomerate can be used as a reduction means with the production of steel. With the small grain size it is possible to use the same technology as with blown in pulverized coal. Therefore, existing steel mills need not to be retooled. If necessary, different nozzles are used.

Cement is produced from natural raw materials. The most important basic materials are limestone and clay, which are mostly quarried separately and subsequently mixed together in an appropriate proportion. The raw materials are produced in quarries. There, the materials are either loosened by blasting or with heavy machinery, and subsequently comminuted in a crusher plant into crushed stone. After transport to the plant, the raw crushed stone is homogenized. Further, the necessary corrective materials, such as sand, loess, or iron oxide are mixed in. In the next step, the raw mixture of the weighed portions of the raw material is ground together very finely into a "raw meal". Depending on the method, the stone is ground fine with steel balls or steel rollers and dried by hot oven emissions. Finally, the raw meal can be fired into cement clinker. Returning dust from the firing process is extracted in filters and supplied again into the silos.

The firing procedure occurs in drum type furnaces, which have diameters of several meters and are 50 to 200 meters long. The ovens are lined on the interior with fire-proof stone, and rotated slowly along their longitudinal axis. Due to a slight incline the raw meal inserted at one end slowly travels towards the flame to the other end of the oven. A so-called cyclone pre-heater is connected in front of the drum type furnace. That is a heat exchanger, which is composed of a system of several cyclones—which are apparatuses for the dedusting of gasses using gravitational forces. Here, the raw meal is heated to approximately 800° C. At the lower end of the drum type furnace—the so—called sinter zone—the furnace stock is then heated to 1,400 to 1,450° C. Here, it partially begins to melt. The result is a chemically converted furnace product—the clinker. This product subsequently leaves the oven and arrives in the cooler, before it goes on to storage. The hot cooling air serves as combustion air.

In the course of the energy intensive process, plastic can be burned during the creation of cement as a replacement of the primary fuel (coal, petroleum, or gas). The cement industry, due to the high energy needs with the creation of cement, is particularly inclined to use plastic as an alternative fuel.

It is known to use industry waste and household waste such as waste oil, animal meal, dried sludge, or plastic (with the exception of PVC) as a fuel alternative. The temperatures of 2,000 degrees, which are attained in the cement industry ovens lie significantly higher than those in the combustion systems. Therefore, they are better suited for the disposal of "special waste", insofar as the cleaning of the exhaust gas is given sufficient attention. This is, because critical pollutants can arise during the combustion process, which should not to be underestimated. For example, the often discussed dioxin or other, yet unknown today and therefore, not detectable materials. A part of the accruing pollutants with the production of cement are bound in the product by the chemical processes, and therefore, do not enter the environment with the flue gases. From a current viewpoint, this is also an advantage compared to the disposal in combustion systems.

According to the invention, ground agglomerate in different fractions, especially in the size range of 0.4 to 5.0 mm, is used. A smaller sized fraction of e.g., <0.16 mm can be blown similarly to pulverized coal. The fuel arising for use by the fractioning is nearly homogeneous, which results in a homogeneous thermal calorific value and whereby large fluctuations in the process can be avoided.

In the construction of houses, e.g. during spackling of gypsum plaster board, dried gypsum spackle is used for mixing with water, or paste-like spackle are used. These can contain, for example, gypsum, limestone, perlite, kaoline, mica or quartzes. Materials such as perlite are partly very expensive. According to the invention, a fine fraction of ground agglomerate of mixed plastics can be used as filler with spackle, and therefore substitute other materials. In building construction, light mortar, such as light plaster is likewise increasingly used. Usually, hollow glass balls or perlite are used as aggregate, in order to reduce a sinking of the mortar during the drying process, and to improve the thermal conductivity. With these products also, ground agglomerate of mixed plastics can be used in order to substitute the described aggregates. The ground agglomerate is dimensionally stable because it does not absorb water and as a result, during the drying process is not subject to a shrinking process. Thus, because the material does not absorb water, in comparison to the usual filler, less water needs to be added to the plaster. The plastic has a lower thermal conductivity than the usual standard plaster without light aggregate, such that it also leads to a thermic improvement of the plaster or mortar.

The fraction for spackle should be composed of dust of the size <0.04 mm, so that, during the smoothing with a smoothing trowel, striation do not occur in the surface of the spackle.

The fraction of plastic for light mortar or, light plaster should be granular and contain as few fibers as possible. With the example described above, the plastic fraction is smaller than 1.25 mm.

The invention also relates to a decontamination and/or a de-inking of mixed plastics from the waste disposal, especially for the above specified usage possibilities. With the use as a fuel, it is mostly not harmful that the waste plastic contains organic components and/or printing ink, which for other applications can become noticeably harmful. According to the invention, the grinding process for the mixed plastic agglomerate is performed such that in the process essentially all harmful materials are removed and also the printing inks can be separated. Preferably, this occurs in the grinding apparatus, such as the disc refiner, wherein additionally, water is used. Through the grinding process, organic material is removed or dissolved and discharged through the water, after which it can subsequently be disposed. The same applies to the removal of the printing inks (de-inking). The decontamination process and also the de-inking can possibly be improved if the agglomerate is boiled before the grinding process. The de-inking occurs also without boiling of the agglomerate through the addition of a large quantities of water or superheated steam during the grinding process. A further cleaning step according to the invention can consist in that during drying of the ground stock, air or high temperature steam is directed in circulation over the ground stock for the removal of the remaining harmful components, especially unhealthy or, at least, malodorous organic materials. It is understood that through the addition of chemical substances, especially the de-inking process can be improved. Through the decontamination and the de-inking the use of ground stock becomes possible for different purposes, e.g., as an aggregate for spackle and mortar.

Fillers are used everywhere where sensitive goods must be protected from damage during transport. Here, for example, flakes composed of styrene, pillows filled with air, or plastic film with trapped air can be used. The requirement for such fillers is a specified compressibility with, at the same time, resiliency. It must be able to buffer impacts.

With the invention, a coarse fraction of the agglomerated ground stock of >5.0 mm can be used as filler. Such flakes, due to their size and fibrous structure, permit good compression and, when the pressures subside, expansion back to their original structure. This fraction also must possibly be cleaned and be subjected to a de-inking process, as was described above. For this, agglomerated mats can, in addition, be driven onto a throughflow dryer, in which organic components are decomposed. The mats so produced can be pre-compressed and with their increased apparent density used for transport. Depending on the process control and the formation of the apparent density of the mats, they can be rolled or shaped as bails. For the further processing after the transport, the bales,—e.g., as is known from the pulp industry or with the production of textile fibers—can be re-frayed with bale openers or bale pickers.

As already mentioned, the spacing between the grinder ribs with the refiners used is to be selected so large that no stoppages can result from the stock to be ground. Naturally, the grinder gap is smaller than the diameter of the stock to be ground. Nevertheless, it can occur that due to fiber formation, the stock passes through the refiner relatively unground. To prevent this, barriers can be built at the real distances between the adjacent grinder ribs, where said barriers ensure that the ground stock, during its radial passage in the direction of the opposite-lying grinding disc, is moved such that a grinding also of such materials is attained. The barriers can be formed ramp-like and can also have a certain radial length, in order to increase the effectiveness of the grinding.

BRIEF DESCRIPTION OF THE SEVERAL VIEWS OF THE DRAWINGS

The invention is explained in the following using an exemplary embodiment represented in the drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
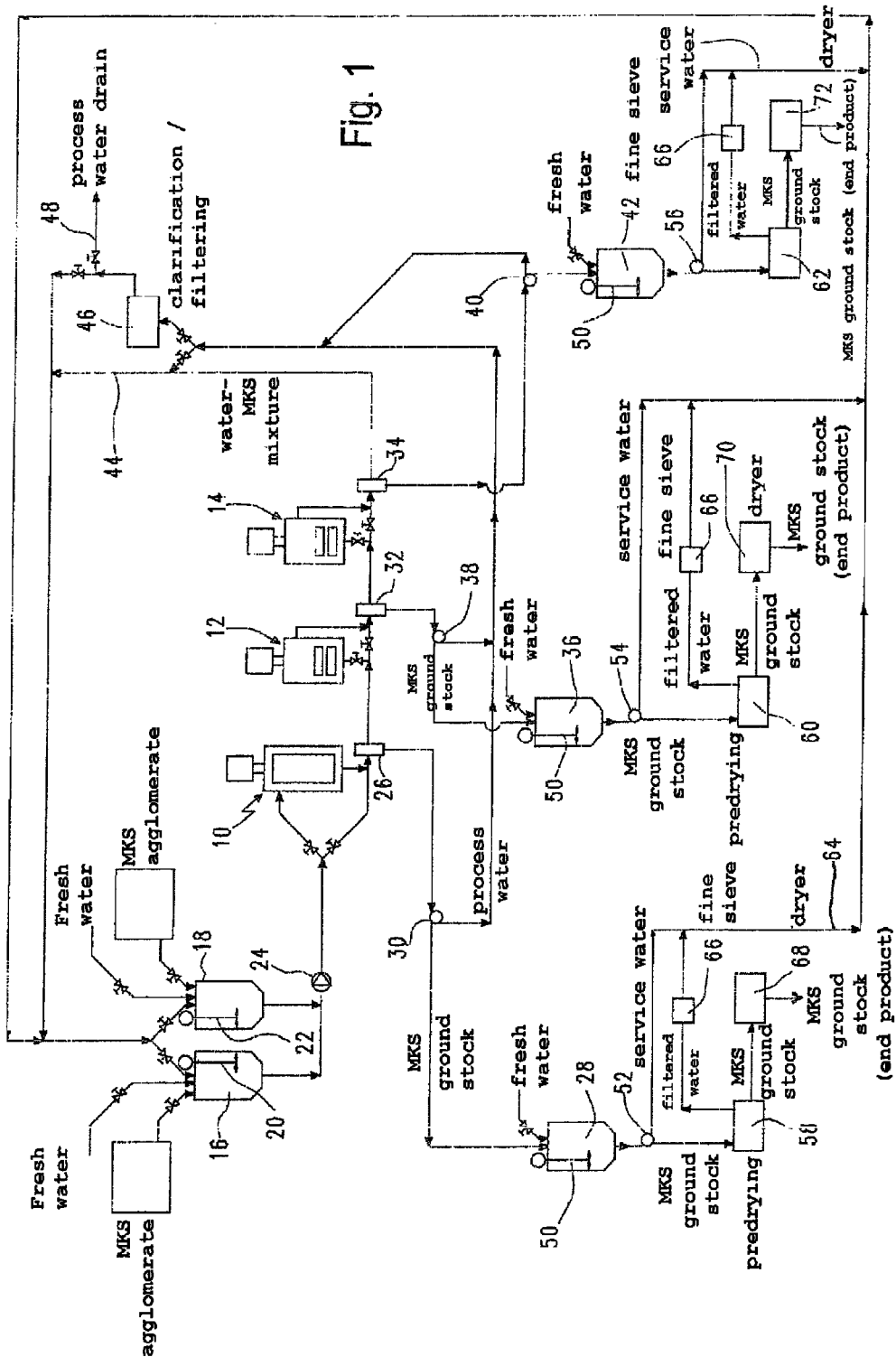
FIG. 1: schematically shows a first system for performing the method of the invention.

In FIG. 1, a drum refiner 10 and two disc refiners 12, 14 are arranged in series. They are driven by a suitable drive motor. They serve for comminuting agglomerated mixed plastic (MKS agglomerate). The agglomerate is fed into two parallel containers 16, 18, into which fresh water is also introduced. Each container 16, 18 is assigned an agitator 20 or 22, respectively. It must be ensured that the agglomerate is distributed as uniformly as possible in the volume of water. The ratio of agglomerate to water amounts to e.g., 30:70. The mixture of agglomerate and process water is fed into the first refiner stage 10 using a pump 24. The ground stock is fed into a first sorter 26, with which finer components are separated and can be fed into a first cleaning container 28, while process water is withdrawn before, using a curved sieve 30. The remaining ground stock can be fed back either into one of the containers 16, 18 by going through further sorters 32, 34, or into the next refiner stage, where in so doing the ground stock e.g., of the stage 12 can be separated out in the sorter 32, such that in turn finer stock reaches a second cleaning container 36, where in so doing process water is extracted again, using a curved sieve 38. Alternatively, the coarser ground stock can again be fed back via the sorter 34 into the associated container 16 or 18, or fed into the third refiner stage 14, whereupon the ground stock then reaches sorter 34, and in turn the finer ground stock reaches, via a third curved sieve 40, a third cleaning container 42. The process water, which is extracted via the curved sieves 30, 38, or 40 reaches one of the containers 16, 18 either directly via a line 44, or via a purification stage 46. Alternatively, a drain can be provided for the process water, as is indicated with 48.

Each cleaning container 28, 36, 42 is assigned an agitator 50. The cleaning containers 28, 36, 42 are supplied with fresh water for the purpose of cleaning the ground stock. The ground stock reaches, in each case via a curved sieve 52, 54, or 56, a mechanical predrying stage (preferably a screw extruder) 58, or, 60, or 62. Service water is drawn off in the associated curved sieve 52, 54, 56, and fed via a line 64 into one of the containers 16, 18. Optimally, this service water can instead of fresh water be fed back into the cleaning containers 28, 36, or 42, until a defined degree of contamination is reached. A drying of the ground stock occurs in the solid—fluid separation 58 to 62, such that said ground stock still contains only 30% moisture. The separated water is also entered, via a fine sieve 66, into the line 64. Optionally, this water can also be led into a separate line. The predried ground stock is finally dried in a dryer 68 or 70 or 72.

As can be seen, using the described system a desired ground stock fraction can be extracted, isolated from MKS agglomerate, and at the same time, cleaned and dried. The number of refiner stages 10, 12, 14 and the process cycles can be adjusted optimally according to the desired ground stock product. The quantity of water to be used is, if losses are neglected, only so large as the losses during the final drying. As already mentioned, the ground stock dried in the predrying stage still has a moisture of approximately 30%. This quantity of water must be supplemented by the addition of fresh water into the containers 16, 18, or the cleaning containers 28, 36, and 42.

Figure 2:
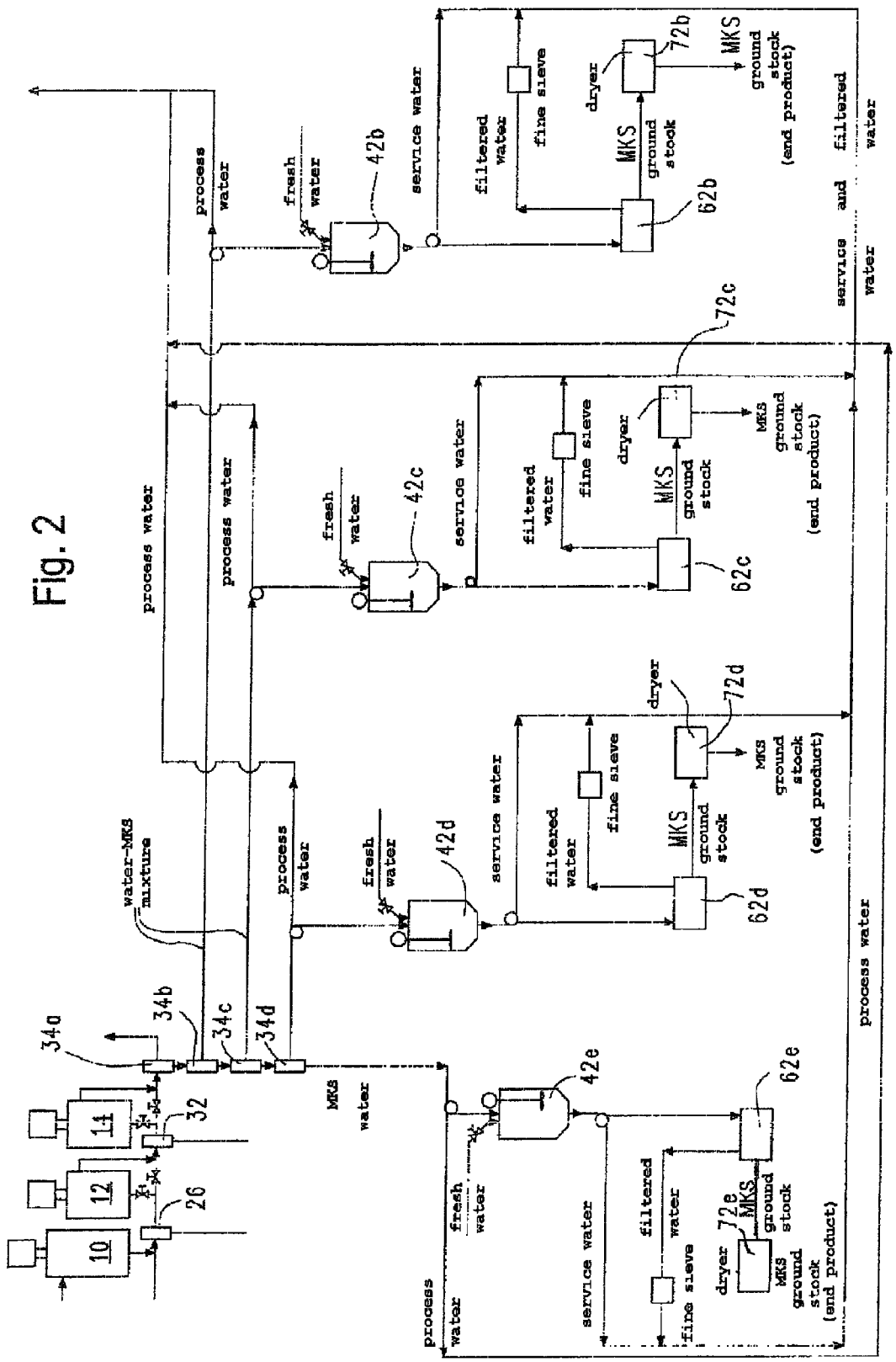
FIG. 2: shows a detail of the system according to FIG. 1, FIG. 3: shows a rough schematic top view of a disc and disc segments of a disc refiner.

FIG. 2 shows partly the same assemblies as FIG. 1, such that these will not be explained in more detail. It can be seen that the sorter 34 can be composed of a plurality of sorters 34a to 34d, using which individual fractions can be separated off and can be led to separate cleaning containers 42b, 42c, 42d, and/or 42e. If primarily, a ground product of a specific particle size distribution curve is desired, it is understood, that only this fraction can be subjected to a separate cleaning. This series connection of sorters is, as a matter of principle, possible with all sorters of the described system.

At the top of FIG. 3, a rough schematic top view of a refiner disc 80 can be recognized, which is composed of individual segments 82, which are screwed onto a support body. The segments contain radial flutes or ribs, which can also be formed arc-like depending on the use case. With the segments 82 in the lower representation, a radial direction of the flutes or ribs is represented. For performing the described method, it is important that the spacing between the ribs or flutes, which is indicated with 84, is greater than the diameter of the agglomerate. Naturally, this holds for the spacing between the ribs up to the radial outer end. The input with the disc refiners is, as is generally known, in the axis, as is indicated with 86. The material travels radially outward, corresponding to arrow 88, and is ground between the ribs or flutes of the stator disc and the rotating disc, e.g., with a grinder gap of 0.2 mm. In order to prevent that the material without being ground—reaches the outside through the flutes, webs 90 can be built into the flutes, where said webs have the effect that the material is partially deflected in the axis direction into the direction of the adjacent disc, in order to effect that the agglomerate, in each case, is effectively comminuted, even if it is formed out of film material.

Figure 4:
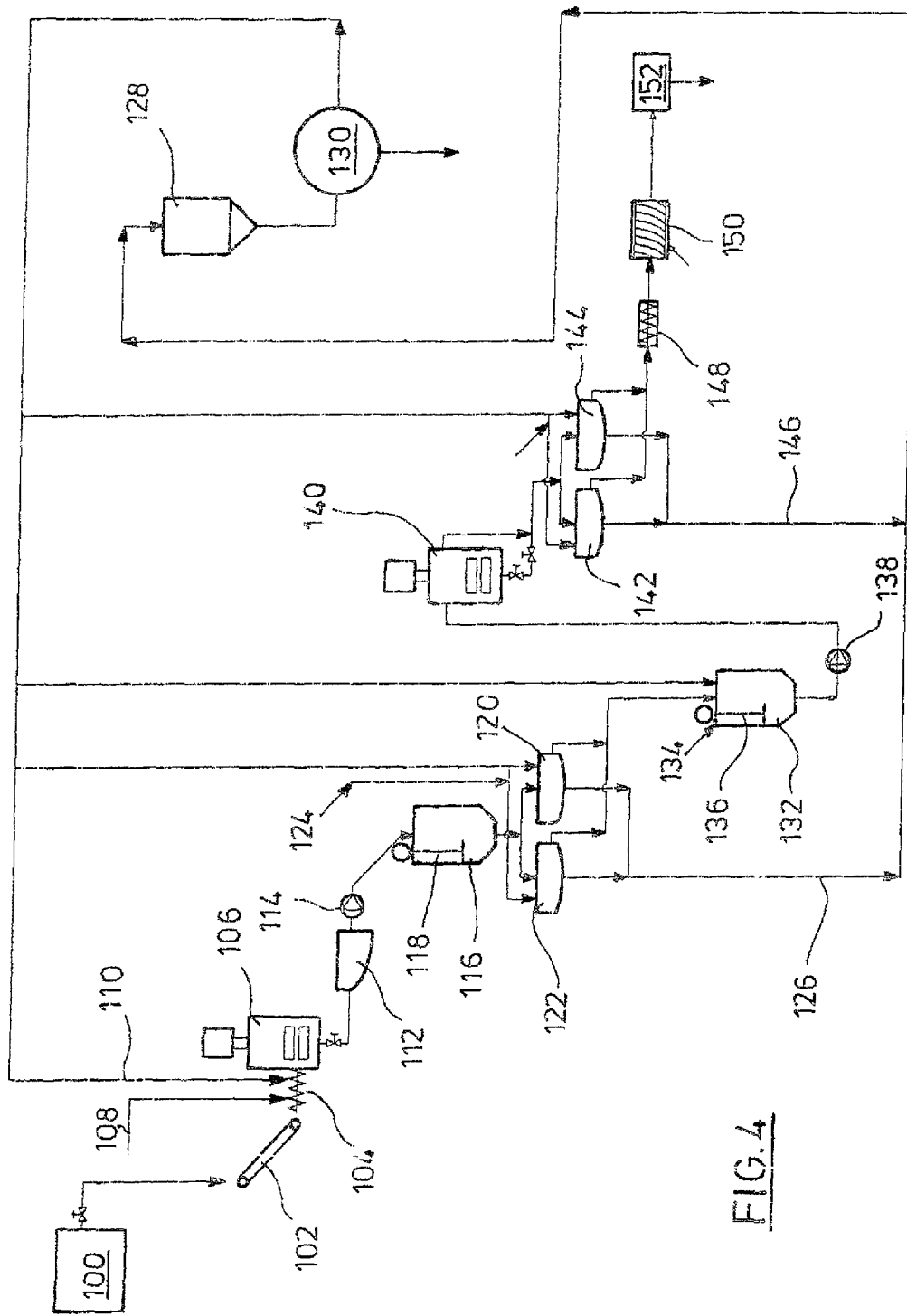
FIG. 4: shows another embodiment of a system for performing the method of the invention.

With the embodiment according to FIG. 4, mixed plastic agglomerate from a storage container 100 reaches, via a conveyor 102 and a screw conveyer 104, a first refiner 106. This can be a single disc, double disc, twin flow refiner, or also a drum refiner. Fresh water is channeled into the screw conveyor via 108, and cleaned process water via 110 (this will be explained further in the following). It is also conceivable, from the outset to supply a suspension of agglomerate and water into the screw conveyor 104, or to lead the water into the refiner in another way.

Using a pump well 112, a pump 114 transports the ground stock to a container 116, in which an agitator 118 is arranged. Two sieve arrangements 120, 122 are located at the outlet of the container 116, into which is fed, along with the aqueous ground stock, cleaned process water or fresh water via 124. The sieve openings have a width of approximately 0.25 mm, such that granular ground stock is collected above this size, whereas a fine grain fraction passes through with the process water, and using a line 126 reaches a dirty water container 128 and from there to a waste water treatment 130. It is understood that the so-called fine grain fraction, which is drained off with the process water, is on its part still filtered or sieved in order to extract the fine parts, to utilize them or to dispose of them.

The remaining ground stock with a grain size of >0.25 mm reaches a further container 132, into which cleaned process water is fed or, via 134, fresh water. This container also contains an agitator 136. The ground stock washed in the container 132 reaches a second refiner 140, using a pump 138. At the output of the refiner 140 are two sieve arrangements 142, 144 with sieve openings of approximately 0.25 mm, such that in turn a fine grain fraction with process water reaches via 146 into the process water line 126 into the waste water treatment 130. The remaining ground stock is fed via a screw conveyor 148 into a centrifuge 150, in which the process water is removed. It can also be led to a waste water treatment, which however, is not shown. The ground stock with low moisture is dried in a dryer 152 and from there conveyed into a silo. The ground stock can, after the drying, be separated into desired grain fractions, for which suitable techniques are available.

Figure 5A:
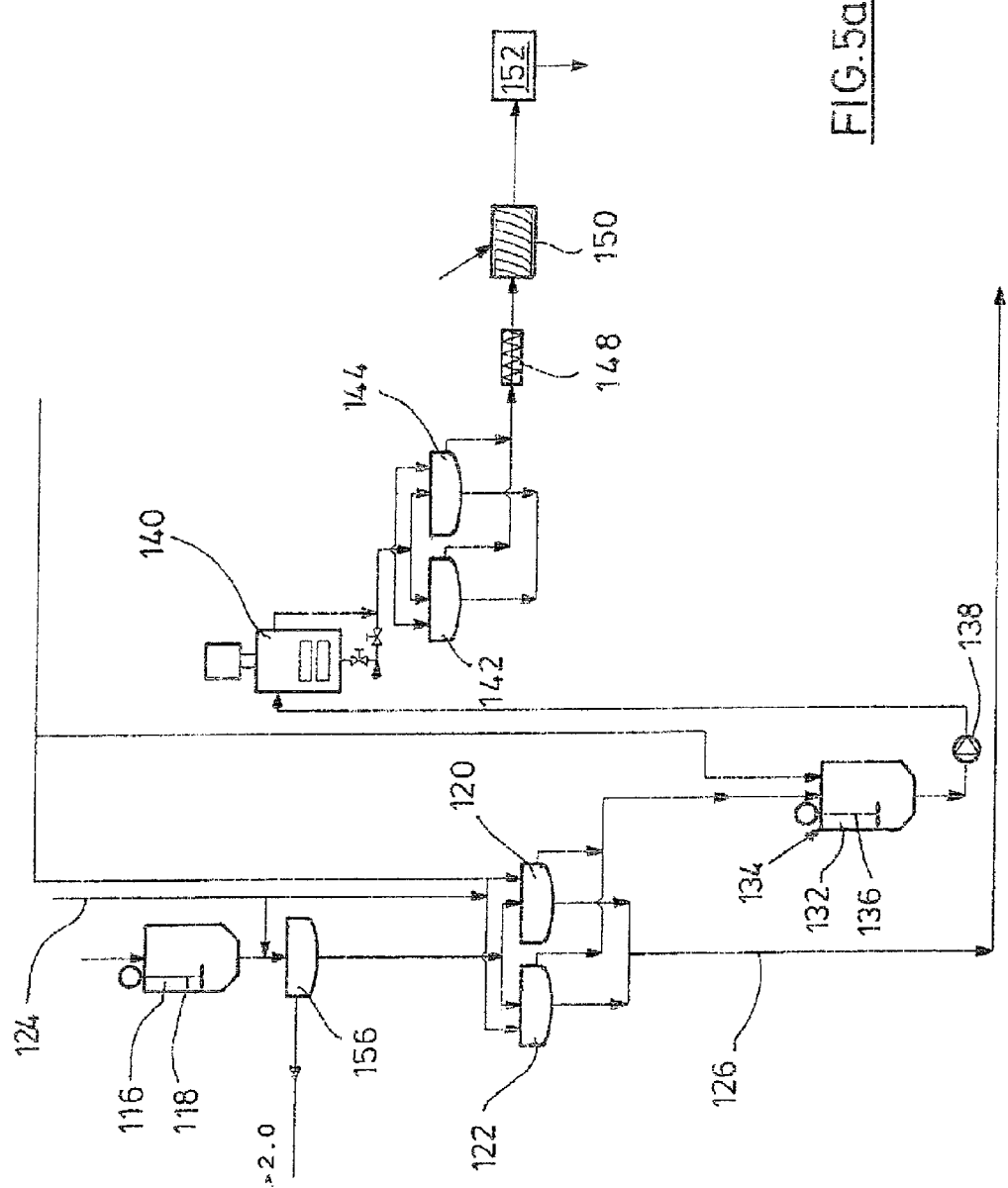
FIGS. 5a to c show modified embodiments of the system according to FIG. 4, FIGS. 6a to d show modified embodiments of the second grinder stage according to FIG. 4.

In the embodiment according to FIG. 5a, the system parts, which are the same as the system parts according to FIG. 4, are provided with the same reference numbers. It can be recognized that between the container 116 and the sieve arrangements 122, 120, a sieve arrangement or a sorter is arranged with whose help a so-called oversize grain >2.0 mm is removed, while the smaller grain is fed with the process water into the sieve arrangement 120, 122. The oversized grain is normally discarded or introduced again to the grinding process of the first grinder stage.

Figure 5B:
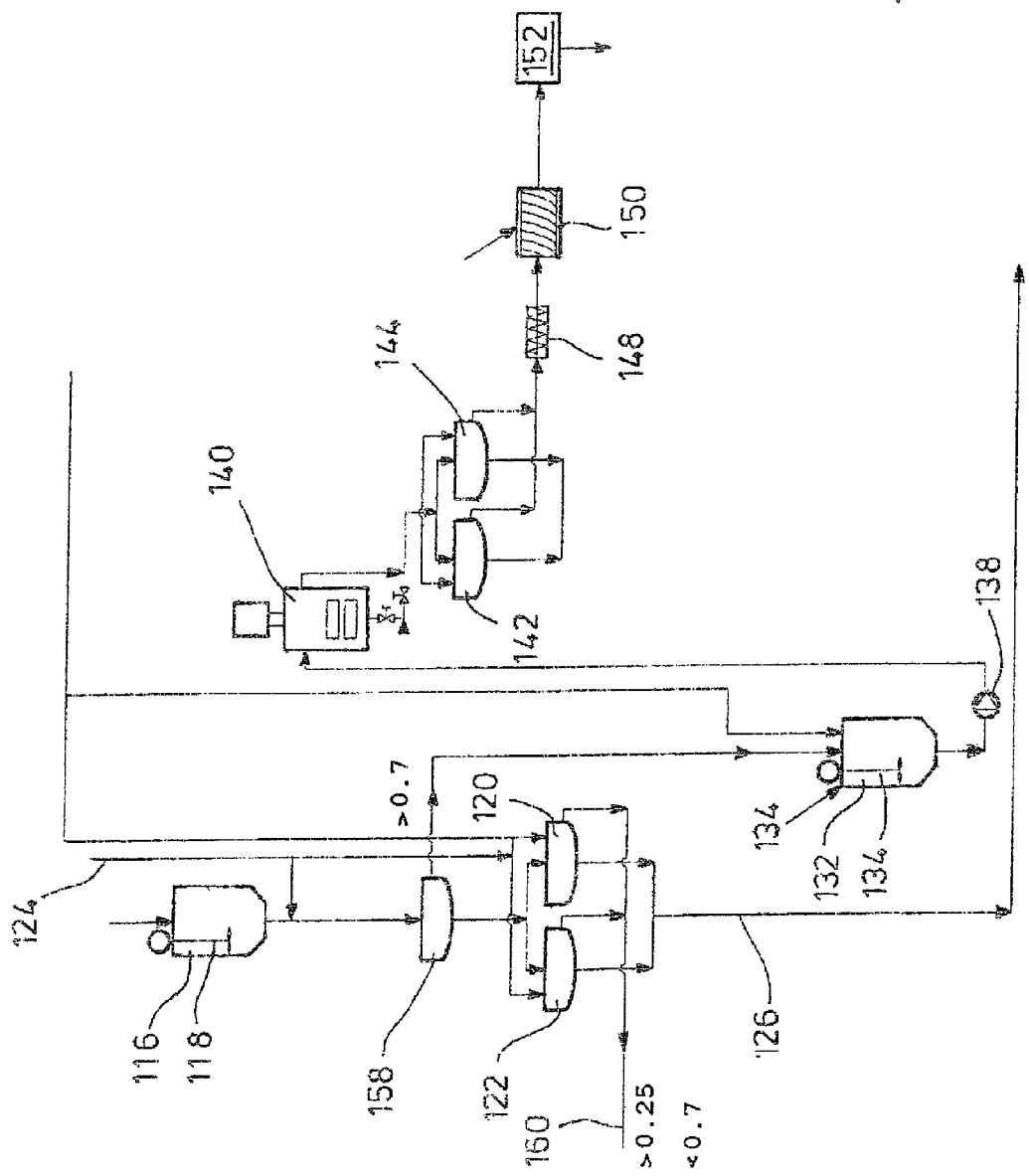

With the embodiment according to FIG. 5b, a sorter or a sieve arrangement 158 is arranged between the container 116 and the sieve arrangement 122, 120, such that the grain above 0.7 mm is removed and led into the container 132, for the purpose of further grinding in the second refiner 140. The ground stock of smaller grain size reaches the sieve arrangements 120, 122, wherein via 160 the separated ground stock is led off that has a grain size less than 0.7 and greater than 0.25. This ground stock can be dewatered directly or mixed with the remaining ground stock, and dried and supplied to an application.

Figure 5C:
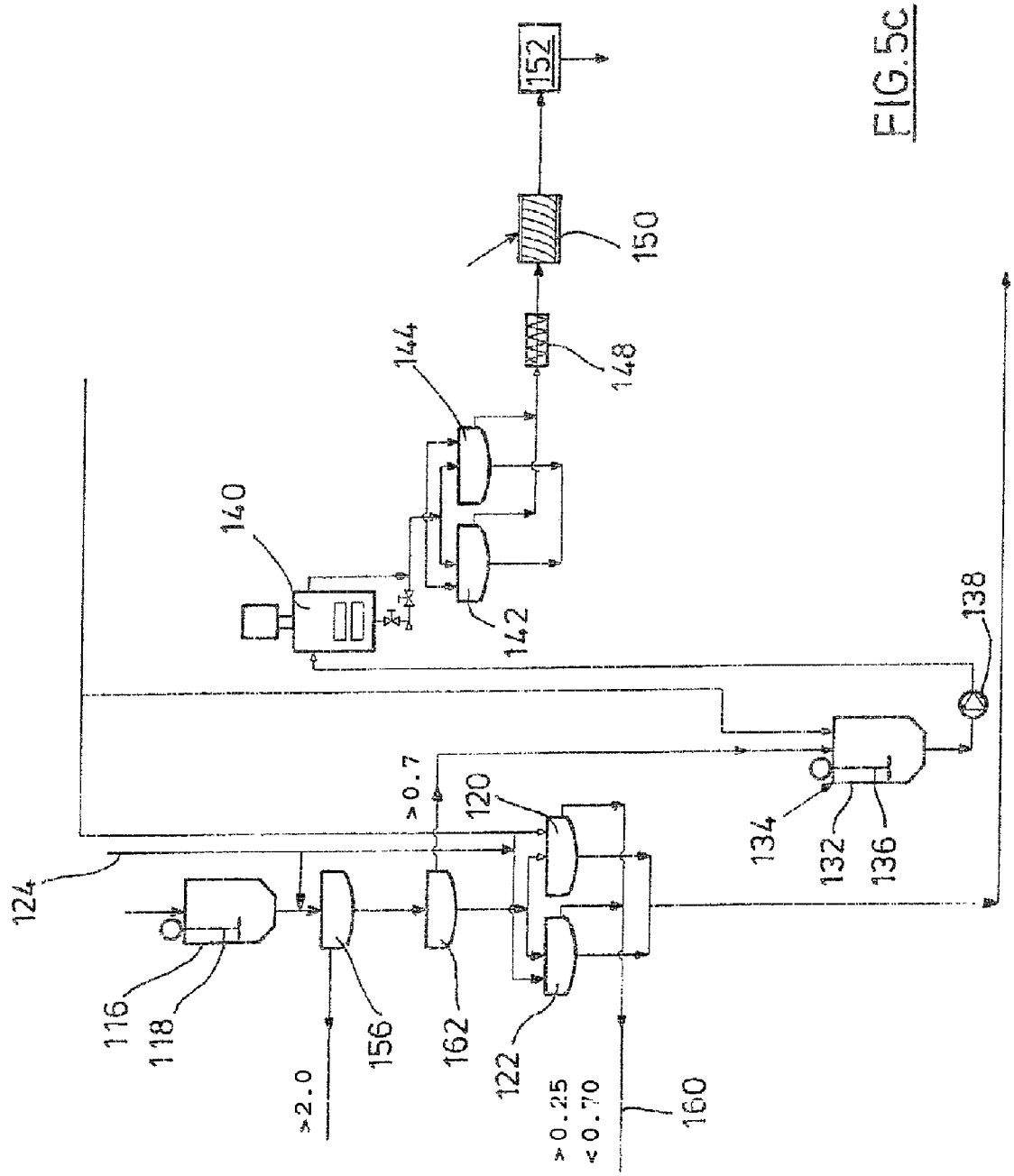

With the embodiment according to FIG. 5c, a further sieve arrangement or a sorter 156 is connected after container 116, as is also described with FIG. 5a. Connected subsequently is a further sieve arrangement 160. It is provided with an opening width such that the ground stock with a grain size of >0.7 is removed and fed into the container 132 for further grinding. Oversized grain >2.0 mm is removed from the sorter or the sieve arrangement, as has already been described in connection with FIG. 5b. The ground stock, which arrives from the sieve arrangement 162 at the sieve arrangement 120, 122 is separated there from the ground stock with a grain size >0.25 and <0.7 mm.

With the embodiments according to the FIGS. 6a to 6d, different embodiments of the second grinder stage according to the embodiment according to FIG. 4, are indicated. As far as there is agreement with the parts according to FIG. 4, the same reference numbers are used.

In the embodiment according to FIGS. 6a to 6d, two tracks of the mechanical dewatering and drying are represented, namely through the centrifuge 150a, 150b, or dryer 152a or 152b. Also, a dewatering occurs already through the screw conveyor 148a or 148b.

In FIG. 6a, the fine grain fraction is removed again from the ground stock of the second refiner 140, and is led off with the process water. The remaining ground stock with a grain size of >0.25 reaches the second drying track 148b, 150b, and 152b. Fractions of the ground stock from the first refiner stage according to FIG. 4 or FIGS. 5a to c are mixed into the ground stock from the second refiner stage via line 166. The same ground stock is supplied via 168 to the first drying track 148a, 150a, and 152a. Therefore, two different fractions of the ground stock are isolated, namely, a fraction with the grain size range between >0.25 and an upper value, and a grain size range from e.g., 0.7 up to an upper range.

Figure 6B:
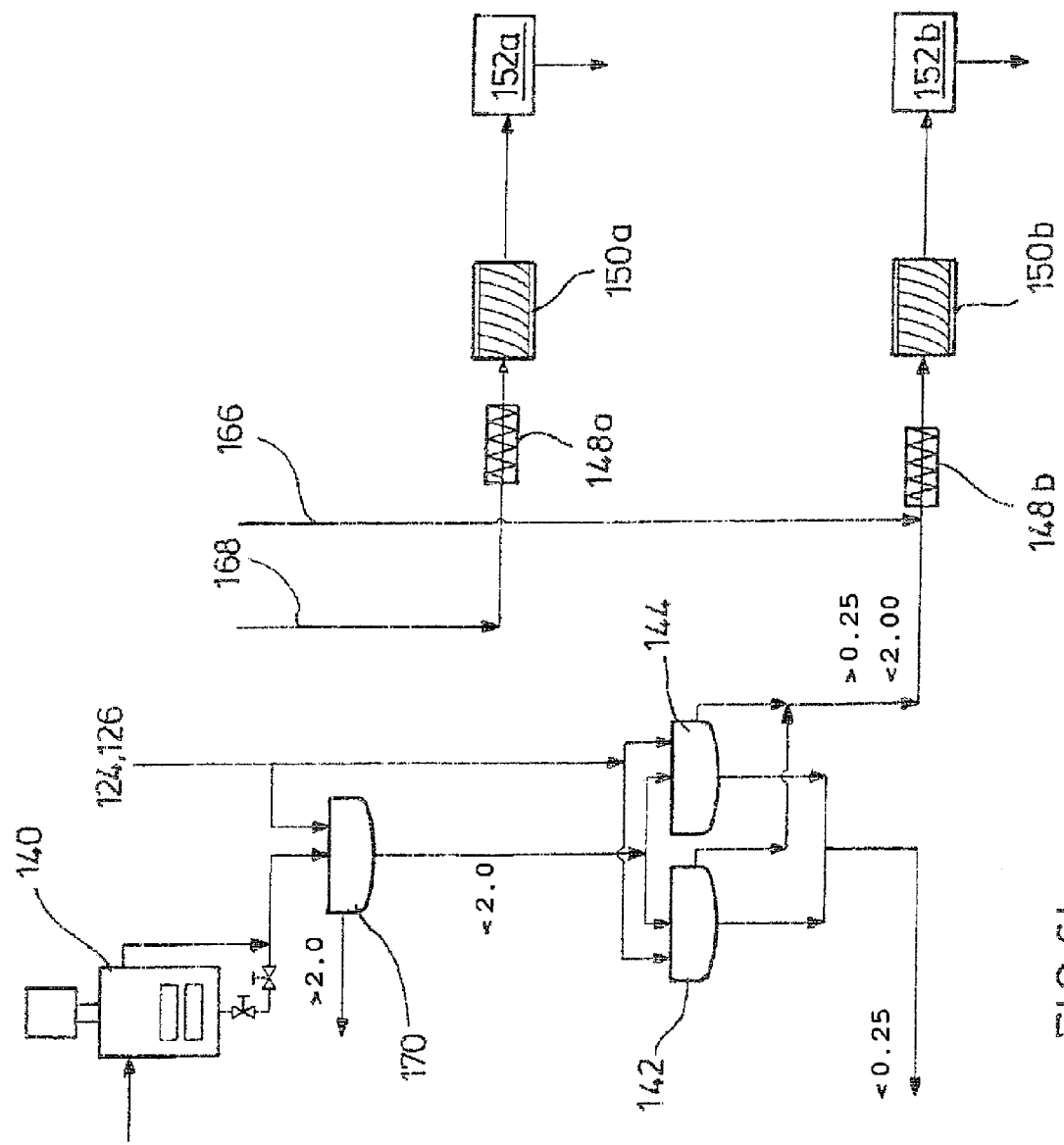

With the embodiment according to FIG. 6b, a sieve arrangement 170 is connected between the sieve arrangement 142, 144 for the separation of a fine grain fraction, via which the so-called oversized grain with a grain size of >2.0 is extracted, which e.g., is discarded. Thus, a grain fraction of >0.25 and <2.00 mm reaches the lower drying track. A fraction as described for FIG. 6a arrives in the upper drying track.

Figure 6C:
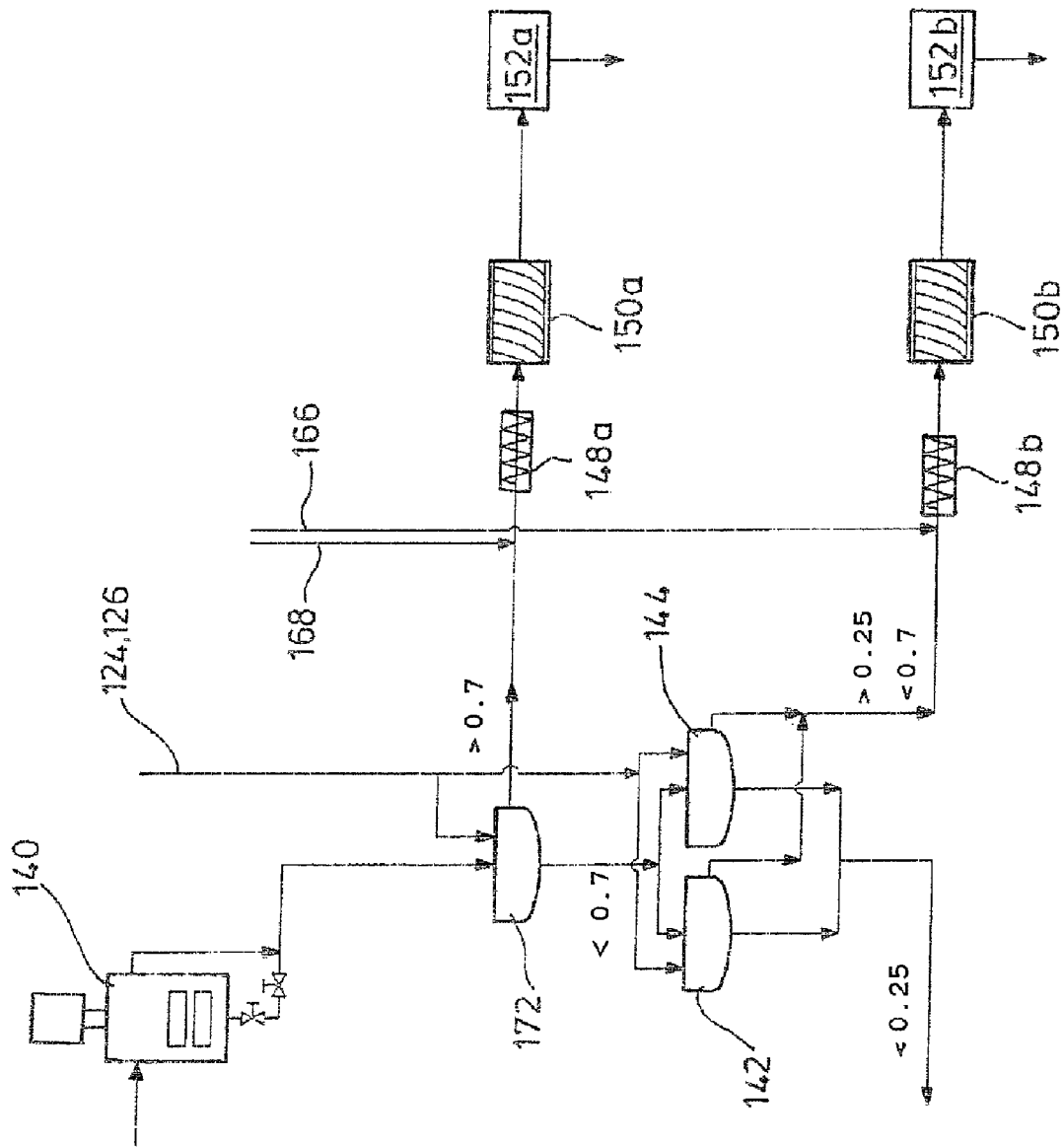
Figure 5D:
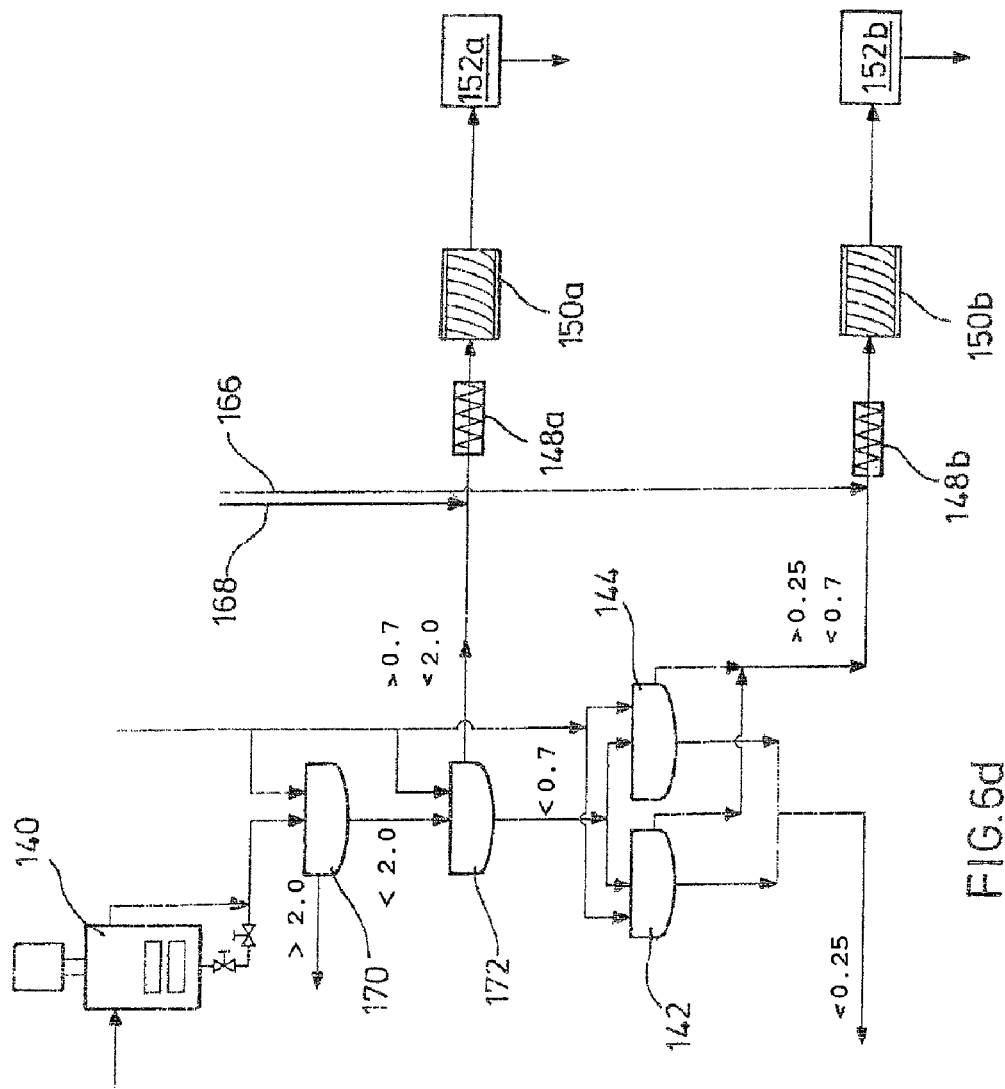

With the embodiment according to FIG. 6c, a sieve arrangement 172 is arranged between the refiner 140 and the sieve arrangement 142, 144, with which the grain size >0.7 mm is separated, whereas a fine portion <0.25 mm is removed with the process water in the sieve arrangements 142, 144.

Therefore, material with the grain size >0.7 mm reaches the upper drying tract, and material with a grain size >0.25 and <0.7 mm arrives in the lower drying tract. Here too, two different fractions are isolated, to which are added via 166 or 168 a grain fraction from the first grinder stage according to FIG. 4 or FIGS. 5a to 5c.

With the embodiment according to FIG. 6b, both sieve arrangements, 170 according to FIG. 6b and 172 according to FIG. 6c, are arranged in series after the first refiner. With the first sieve arrangement 170, the oversized grain >2.0 mm is removed, and with the second sieve arrangement 172, a material with the grain size <2.0 mm and >0.7 mm is removed and led in to the upper drying tract. The ground stock with a grain size >0.7 mm arrives in the sieve arrangements 142 and 144, wherein—as already explained repeatedly—the fine grain portion <0.25 mm is removed with the process water, whereas a grain fraction >0.25 and <0.7 mm reaches the lower drying tract.

In particular, the embodiments according to the FIGS. 6a to 6d highlight how already during the grinding process and in connection with a suitable sieving, various grain fractions or grain particle distribution curves can be attained. Naturally, it is understood that a further separation of individual fractions can take place also after the final drying.

The addition of flakes from pure PP and/or PF, or from the sorting from waste plastics during compaction and agglomeration, leads to an improvement of the processing properties. The homogenizing takes place during the grinding in the aqueous medium. This yields product advantages, as can otherwise only be attained by subsequent compounding of the ground stock by addition of pure plastics. Therefore, the process of granulation in an extruder is saved, where the ground stock according to the invention can nevertheless be processed to granulate or to pellets. With the invention, MKS coming from waste, already damaged with reduced strength properties, no longer need to be subsequently enriched through compounding because this already occurs during the compacting. The energy and cost intensive granulation process of mixing and homogenizing is obviated.

It is understood, that other materials also, such as fillers and additives, can be added during the compacting, insofar as they are not water soluble or present in a fine powder form.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for comminuting and cleaning waste or mixed plastic, the method comprising:
   producing a compacted material, comprising an agglomerate from film scraps or film remnants comminuted into flakes and/or thick-walled plastic parts chopped up into chips,
   introducing the compacted material into a disc or drum refiner and grinding in the presence of water, wherein the portion of compacted material located in the refiner amounts to at least 10 percent by weight,
   removing a fine grain fraction together with process water from the ground stock exiting from the refiner by separation with a sieve or a filter,
   washing the remaining ground stock and either mechanically dewatering and drying, or pulverizing in a further refiner stage in the presence of water, and subsequently dewatering and drying.

2. The method according to claim 1, wherein the fine grain fraction has an average maximum grain size of approximately 0.25 mm.

3. The method according to claim 1, wherein the grinding occurs in a refiner, in which the spacing between the ribs of the grinding discs is greater than the maximum size of the particles of the compacted material, and the spacing between the grinding discs is smaller than the maximum size of the particles of the compacted material.

4. The method according to claim 3, wherein the grinding occurs in a refiner, in which cross segments are arranged between adjacent grinder ribs of the grinding discs, which reduce the cross section between adjacent grinder ribs wherein the particles are deflected to the adjacent refiner disc.

5. The method according to claim 4, wherein the cross segments increase in the shape of a ramp in the feed direction of the stock.

6. The method according to claim 1, wherein the compacted material is introduced into the refiner by a screw conveyor.

7. The method according to claim 6, wherein water is introduced into the screw conveyor.

8. The method according to claim 1, wherein the compacted material and water are placed into a container before the grinding, and the compacted material is distributed uniformly in the volume of water, wherein the portion of the compacted material amounts to at least 10% by weight of the container contents, and water with the distributed agglomerate is introduced under predetermined pressure into the refiner, wherein the water separated out of the refiner discharge can be at least partially led back into the container.

9. The method according to claim 8, wherein the minimum quantity of water corresponds to a volume which can be absorbed by a predetermined volume of compacted material.

10. The method according to claim 1, wherein the ground stock before the removal of the fine grain fraction is led back with the process water one or more times in circulation into the refiner.

11. The method according to claim 1, wherein the service water from the individual process stages is led back after the grinding procedure into a previous process stage in the feed direction.

12. The method according to claim 1, wherein the remaining ground stock is introduced with water into a gravitational separation vessel for separating a polyolefin rich fraction from a polyolefin depleted fraction.

13. The method according to claim 1, wherein non-temperature-adapted fresh water is used.

14. The method according to claim 1, wherein the process water extracted with the fine grain fraction, or the process water accruing in the further process stages is purified.

15. The method according to claim 1, wherein chipped stock or fiber stock is added to the mixed plastics before or during compaction.

16. The method according to claim 1, wherein pure PP and/or PE, or PP and/or PE isolated by sorting of mixed plastic, are mixed into the waste plastics before or during compaction or agglomeration.

17. The method according to claim 1, wherein before the separation of the grain fractions, the ground stock is introduced into a vat and agitated therein.

18. The method according to claim 1, wherein the remaining ground stock is introduced into a vat with fresh water and/or cleaned process water.

19. The method according to claim 1, wherein the remaining ground stock is ground in a further refiner stage in the presence of water, and subsequently, a fine grain fraction is again removed with process water from the ground stock.

20. The method according to claim 19, wherein the further fine grain fraction has an average maximum grain size of approximately 0.25 mm.

21. The method according to claim 1, wherein in the process direction, after the first and/or second refiner stage, in addition to the separation of the fine grain fraction, an inline sieving of the remaining ground stock is conducted for separating into different grain fractions.

22. The method according to claim 21, wherein a medium fraction from the first refiner stage is mixed with a grain fraction from the second refiner stage, and that the mixture is mechanically dewatered and subsequently dried.

23. The method according to claim 1, wherein from the remaining ground stock of the refiner or from the large grain fraction of the inline sieving, an oversized grain fraction is removed, having a grain size of at least 2 mm.

24. The method according to claim 19, wherein grinding occurs in at least two refiner stages, and the second stage has a narrower spacing between the grinder ribs and/or a narrower spacing between the grinding discs, wherein the spacing between the grinder ribs is respectively larger in each case than the grain of the stock to be ground.

25. The method according to claim 21, wherein the individual grain fractions are led into a cleaning container with fresh water.

26. The method according to claim 1, wherein cleaned ground stock is mechanically dewatered under pressure.

27. The method according to claim 1, wherein cleaned ground stock is dewatered in a centrifuge.

28. The method according to claim 1, wherein the process water is cleaned and is supplied into the refiner and/or into a cleaning stage.

29. The method according to claim 1, wherein from at least one dried ground stock or a fraction isolated during an inline sieving, at least two grain fractions of different grain size distribution curves are isolated.

30. The method according to claim 1, wherein a portion of the ground stock in a predetermined grain size range is mixed as the second material component with at least one first material component, and the grain size range is selected such that the physical properties of the first material component are changed and/or portions of the first material component are substituted.

31. The method according to claim 30, wherein the first material component has wood fibers for a wood fiber board of medium or high density or a wood particle board, and the second material component has a fiber form as a binder and/or wood substitute, and lies in the grain size range of less than 0.63 mm.

32. The method according to claim 30, wherein the ground stock is separated according to the types of plastic, and the second material component is composed of LDPE, HDPE, and/or PET.

33. The method according to claim 30, wherein the first material component has wood chips for a particle board and the second material component has plastic fibers in the size range of 1.25 to 3.15 mm as a wood substitute.

34. The method according to claim 30, wherein the second material component has fiber shape in the size range of 1.25 to 3.15 mm, and is used as an aggregate for concrete, fire protection concrete, or floor pavement.

35. The method according to claim 34, wherein the aggregate for concrete and floor pavement from the ground stock is composed of LDPE, HDPE, PP, and/or PET.

36. The method according to claim 30, wherein the second material component is granular and in the size range of 1.25 to 3.15 mm, and is used as an aggregate for concrete or floor pavement.

37. The method according to claim 30, wherein from the ground stock is HDPE and/or PET and/or PP.

38. The method according to claim 30, wherein the ground stock is HDPE and/or PP used as aggregate for fire protection concrete.

39. The method according to claim 30, wherein the first material component has rock wool fibers or mineral wool fibers, and the second material component has fiber shape in the size range of 1.25 to 5.0 mm.

40. The method according to claim 39, wherein the ground stock is separated according to the types of plastic, and LDPE and/or PET are used for the second material component.

41. The method according to claim 30, wherein the first material component has wood fibers for wooden insulation, and the second material component has plastic fibers as binder in the size range of 1.25 to 5.0 mm as a binder.

42. The method according to claim 41, wherein the ground stock is separated according to the types of plastic, and LDPE and/or HDPE is used for the second material component.

43. The method according to claim 41, wherein the second material component uses plastic grains as a filler composed of HDPE and/or PET.

44. The method according to claim 30, wherein the first material component has asphalt, and the second material component contains plastic particles in the size range of 0.4 to 5.0 mm as an aggregate.

45. The method according to claim 44, wherein the ground stock is separated according to the types of plastic, and PP, LDPE and/or HDPE is used for the second material component.

46. The method according to claim 1, wherein LDPE chips or HDPE chips from plastic injection mold parts are agglomerated with the mixed plastics.

47. The method according to claim 40, wherein wood fibers are formed into a fibrous mat with the plastic fibers after the aerodynamic fibrous mat formation, and the fibrous mat is dried in a throughflow dryer, wherein the plastic fibers act as binder, wherein the temperature of the flow in the throughflow dryer is higher than the melting temperature of the plastic fibers.

* * * * *